(12) United States Patent
van Bemmel

(10) Patent No.: US 9,560,126 B2
(45) Date of Patent: Jan. 31, 2017

(54) STATELESS LOAD BALANCING OF CONNECTIONS

(71) Applicant: Jeroen van Bemmel, Calgary (CA)

(72) Inventor: Jeroen van Bemmel, Calgary (CA)

(73) Assignee: Alcatel Lucent, Boulogne-Billancourt (FR)

( * ) Notice: Subject to any disclaimer, the term of this patent is extended or adjusted under 35 U.S.C. 154(b) by 695 days.

(21) Appl. No.: 13/887,523

(22) Filed: May 6, 2013

(65) Prior Publication Data

US 2014/0330976 A1 Nov. 6, 2014

(51) Int. Cl.
*H04L 29/08* (2006.01)
*H04L 12/803* (2013.01)
*G06F 9/50* (2006.01)

(52) U.S. Cl.
CPC ..... *H04L 67/1023* (2013.01); *H04L 29/08279* (2013.01); *H04L 67/142* (2013.01); *G06F 9/5083* (2013.01); *H04L 29/08252* (2013.01); *H04L 47/125* (2013.01); *H04L 67/1008* (2013.01)

(58) Field of Classification Search
CPC ... H04L 69/161–69/169; H04L 47/10–47/125; H04L 67/1002–67/1034; H04L 45/72–45/7453; H04L 29/06; G06F 9/505–9/5083
See application file for complete search history.

(56) References Cited

U.S. PATENT DOCUMENTS

| | | | |
|---|---|---|---|
| 6,836,462 B1 | 12/2004 | Albert et al. | |
| 7,231,458 B2 | 6/2007 | Tenereillo et al. | |
| 7,734,730 B2 | 6/2010 | McCanne | |
| 8,850,002 B1* | 9/2014 | Dickinson | H04L 47/70 370/395.32 |
| 2002/0191600 A1* | 12/2002 | Shah | H04L 29/06 370/389 |

(Continued)

OTHER PUBLICATIONS

"RFC 1323—TCP Extensions for High Performance", May 1992 by Jacobson, Braden, &Borman.*

(Continued)

*Primary Examiner* — Wing F Chan
*Assistant Examiner* — Raji Krishnan
(74) *Attorney, Agent, or Firm* — Tong, Rea, Bentley & Kim, LLC

(57) ABSTRACT

A capability is provided for statelessly load balancing Transmission Control Protocol (TCP) connections across a set of servers. A load balancer receives a TCP SYN packet from a client, selects a server for a TCP connection for the client, forms a modified TCP SYN packet including an address of the client, and propagates the modified TCP SYN packet toward the server. The server receives the modified TCP SYN packet, forms a TCP SYN+ACK packet including an identifier (e.g., n bits of an address, an n-bit server index based on mapping information of the load balancer, or the like) of the server, and propagates the modified TCP SYN+ACK packet toward the load balancer. The load balancer receives a TCP packet from the client on the TCP connection, determines a server associated with the TCP connection based on information included within the TCP packet, and propagates the TCP packet toward the server.

24 Claims, 9 Drawing Sheets

(56) References Cited

U.S. PATENT DOCUMENTS

| | | | | |
|---|---|---|---|---|
| 2005/0182968 A1* | 8/2005 | Izatt | .................. | H04L 63/02 |
| | | | | 726/5 |
| 2006/0233106 A1* | 10/2006 | Achlioptas | ............ | H04L 45/745 |
| | | | | 370/235 |
| 2006/0233155 A1 | 10/2006 | Srivastava | | |
| 2009/0144444 A1* | 6/2009 | Chauffour | ............... | H04L 29/06 |
| | | | | 709/238 |
| 2011/0185065 A1* | 7/2011 | Stanisic | .................. | G06F 9/505 |
| | | | | 709/226 |
| 2012/0246637 A1* | 9/2012 | Kreeger | .................. | H04L 45/54 |
| | | | | 718/1 |
| 2013/0163470 A1* | 6/2013 | Chidambaram | ...... | H04L 69/161 |
| | | | | 370/255 |
| 2013/0201989 A1* | 8/2013 | Hu | .......................... | H04L 45/24 |
| | | | | 370/392 |
| 2014/0310390 A1* | 10/2014 | Sorenson, III | .......... | H04L 47/10 |
| | | | | 709/223 |

OTHER PUBLICATIONS

Online article, "The TCP/IP Guide—TCP Message (Segment) Format", Sep. 2005.*
"SYN Cookies," Wikipedia, (http://en.wikipedia.org/wiki/SYN_cookies) printed May 24, 2013.
V. Jacobson, et al., "TCP Extensions for High Performance," Network Working Group, Request for Comments: 1323, May 1992, pp. 1-37.
International Search Report and Written Opinion of PCT/CA2014/050399, dated Aug. 8, 2014, pp. 1-17.

* cited by examiner

STATELESS LOAD BALANCING OF CONNECTIONS

TECHNICAL FIELD

The disclosure relates generally to communication networks and, more specifically but not exclusively, to stateless handling of Transmission Control Protocol (TCP) connections.

BACKGROUND

There are various situations in which it may be necessary or desirable to deploy multiple servers to support connections with client devices. The connections may include any types of connections suitable for supporting client/server transactions, such as Transmission Control Protocol (TCP) connections or other types of connections. Additionally, in at least some situations, it may be necessary or desirable to balance the connections across multiple servers using one or more load balancers. Disadvantageously, however, typical physical load balancers are inflexible and cannot be scaled up or down dynamically based on load, and typical software-based load balancers are stateful and do not handle addition or removal of servers gracefully.

SUMMARY OF EMBODIMENTS

Various deficiencies in the prior art may be addressed by embodiments for stateless load balancing of connections, such as Transmission Control Protocol (TCP) connections, across a set of servers.

In one embodiment, an apparatus includes a processor and a memory communicatively connected to the processor. The processor is configured to receive a synchronization message including a source address field including an address of a client from which the synchronization message is received and a destination address field including an address of a load balancer. The processor is configured to select a server to support a connection for the client. The processor is configured to form, based on the synchronization message, a modified synchronization message including a source address field including the address of the load balancer, a destination address field including an address of the server, and the address of the client. The processor is configured to propagate the modified synchronization message toward the selected server. In one embodiment, a corresponding method is supported. In one embodiment, a computer-readable storage medium stores instructions which, when executed by a computer, cause the computer to perform a corresponding method.

In one embodiment, an apparatus includes a processor and a memory communicatively connected to the processor. The processor is configured to receive a TCP SYN packet including a source address field including an address of a client from which the TCP SYN packet is received and a destination address field including an address of a load balancer. The processor is configured to select a server to support a TCP connection for the client. The processor is configured to form, based on the TCP SYN packet, a modified TCP SYN packet including a source address field including the address of the load balancer, a destination address field including an address of the server, and the address of the client. The processor is configured to propagate the modified TCP SYN packet toward the selected server. In one embodiment, a corresponding method is supported. In one embodiment, a computer-readable storage medium stores instructions which, when executed by a computer, cause the computer to perform a corresponding method.

In one embodiment, an apparatus includes a processor and a memory communicatively connected to the processor. The processor is configured to receive, from a load balancer, a synchronization message including an address of the server and an n-bit server identifier of the server. The processor is configured to generate a synchronization-acknowledgment message including the n-bit server identifier of the server. The processor is configured to propagate the synchronization-acknowledgment message toward the load balancer. In one embodiment, a corresponding method is supported. In one embodiment, a computer-readable storage medium stores instructions which, when executed by a computer, cause the computer to perform a corresponding method.

In one embodiment, an apparatus includes a processor and a memory communicatively connected to the processor. The processor is configured to receive, from a load balancer, a TCP SYN packet including an address of the server and an n-bit server identifier of the server. The processor is configured to generate a TCP SYN+ACK packet including the n-bit server identifier of the server. The processor is configured to propagate the TCP SYN+ACK packet toward the load balancer. In one embodiment, a corresponding method is supported. In one embodiment, a computer-readable storage medium stores instructions which, when executed by a computer, cause the computer to perform a corresponding method.

In one embodiment, an apparatus includes a processor and a memory communicatively connected to the processor. The processor is configured to receive a message of a connection from a client, where the message includes an n-bit identifier of a server indicated by the client for the connection. The processor is configured to determine an n-bit identifier of a server for the connection based on server configuration information. The processor is configured to determine handling of the message based on a comparison of the n-bit identifier of the server indicated by the client for the connection and the n-bit identifier of the server determined based on the server configuration information. In one embodiment, a corresponding method is supported. In one embodiment, a computer-readable storage medium stores instructions which, when executed by a computer, cause the computer to perform a corresponding method.

In one embodiment, an apparatus includes a processor and a memory communicatively connected to the processor. The processor is configured to receive a TCP packet of a TCP connection from a client, where the TCP packet includes an n-bit identifier of a server indicated by the client for the TCP connection. The processor is configured to determine an n-bit identifier of a server for the TCP connection based on server configuration information. The processor is configured to determine handling of the TCP packet based on a comparison of the n-bit identifier of the server indicated by the client for the TCP connection and the n-bit identifier of the server determined based on the server configuration information. In one embodiment, a corresponding method is supported. In one embodiment, a computer-readable storage medium stores instructions which, when executed by a computer, cause the computer to perform a corresponding method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a capability for supporting stateless management of connections is provided.

In at least some embodiments, a capability for supporting stateless management of Transmission Control Protocol (TCP) connections is provided. The stateless management of TCP connections may include performing stateless load balancing of TCP connections across a set of servers, stateless detection and handling of TCP keep-alive packets, or the like, as well as various combinations thereof. In at least some embodiments, the functions are stateless in the sense that state is not maintained per TCP connection.

In at least some embodiments, stateless management of TCP connections is provided by a stateless TCP connection load balancer.

In at least some embodiments, the stateless TCP connection load balancer is configured to perform stateless load balancing of TCP connections across a set of servers. In at least some embodiments, the stateless TCP connection load balancer is configured to perform stateless load balancing of TCP connections across a set of servers based on server configuration information for the set of servers, including updating the server configuration information for the set of servers in response to changes associated with the set of servers such that changes to the servers supporting TCP connections may be identified and, thus, the TCP connections may be appropriately handled (e.g., reconnected, terminated, or the like) based on the changes associated with the set of servers.

In at least some embodiments, the stateless TCP connection load balancer may be configured to perform stateless detection and handling of TCP keep-alive packets. The stateless TCP connection load balancer may be configured to perform stateless detection and handling of TCP keep-alive packets without maintaining TCP sequence number state per TCP connection. The stateless TCP connection load balancer may be configured to detect and handle TCP keep-alive packets in a manner for reducing the number of TCP keep-alive packets exchanged end-to-end on TCP connections.

In this manner, various embodiments of the stateless TCP connection load balancer may support traffic optimizations for topology changes (e.g., by controlling TCP reconnections performed in response to various types of topology changes) and TCP keep-alive packets (e.g., by supporting detection and filtering of TCP keep-alive packets in order to conserve various types of network and server resources).

It will be appreciated that, although primarily depicted and described herein with respect to specific types of networks, connections, protocols, and messages, various embodiments of the capability for supporting stateless management of TCP connections may be applied within various other types of networks, for various other types of connections, for various other types of protocols, or in conjunction with various other types of messages.

Figure 1:
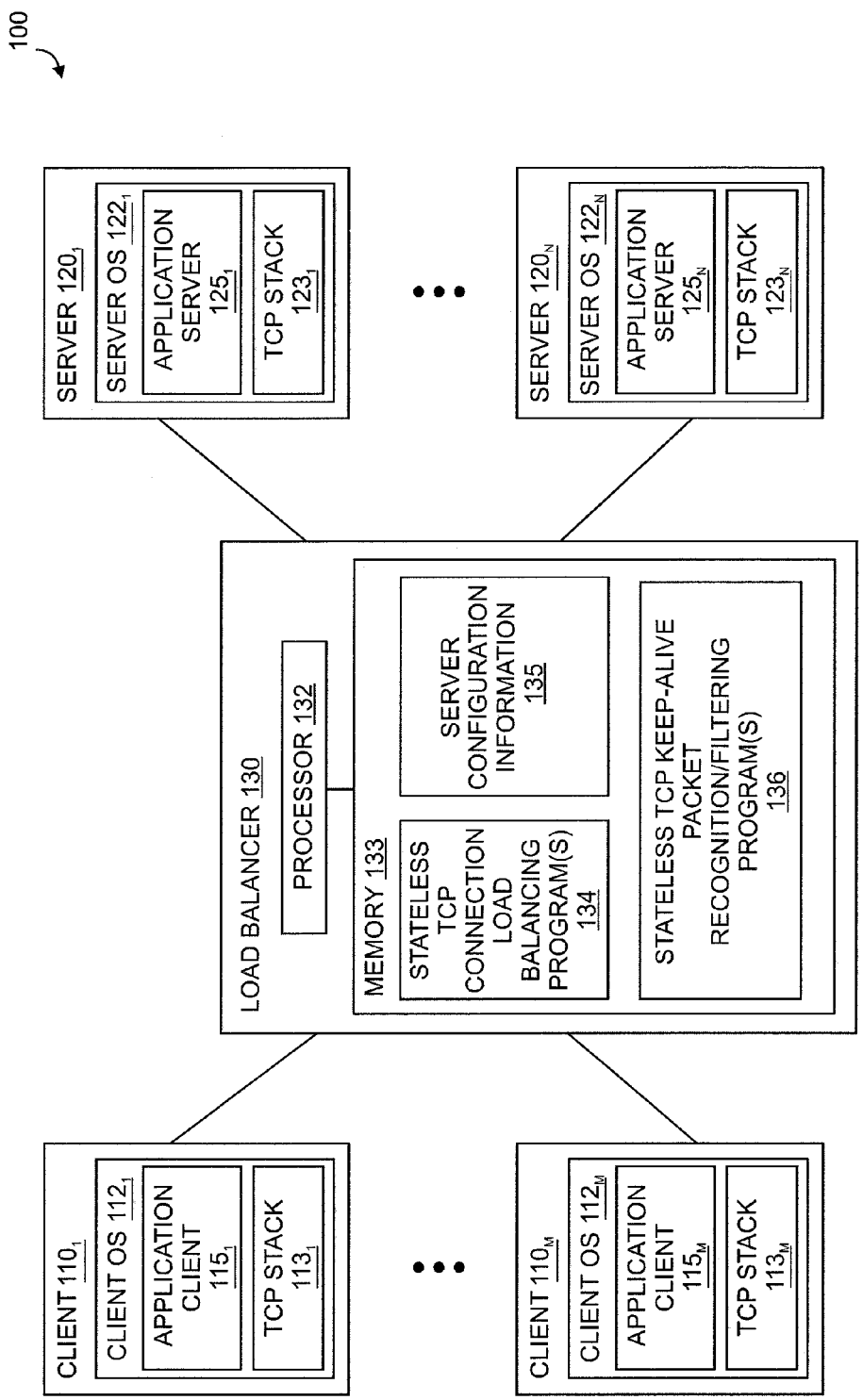
FIG. 1 depicts an exemplary communication system including a load balancer configured to provide stateless load balancing of TCP connections across a set of servers.

Various embodiments of the capability for supporting stateless management of TCP connections may be better understood by considering an exemplary communication system including a load balancer configured to provide stateless management of TCP connections for a set of servers, as depicted and described with respect to FIG. 1.

FIG. 1 depicts an exemplary communication system including a load balancer configured to provide stateless management of TCP connections for a set of servers.

The communication system 100 includes a plurality of clients $110_1$-$110_M$ (collectively, clients 110), a plurality of servers $120_1$-$120_N$ (collectively, servers 120), and a load balancer (LB) 130. The clients 110 and servers 120 may be communicatively connected to LB 130, and may communicate indirectly via LB 130 and directly independent of LB 130.

The clients $110_1$-$110_M$ include a plurality of client operating systems (OSs) $112_1$-$112m$ (collectively, client OSs 112), respectively. The client OSs $112_1$-$112_M$ include a plurality of TCP stacks $113_1$-$113_M$ (collectively, TCP stacks 113), respectively, that may be configured to support TCP communications by the clients $110_1$-$110_M$. The TCP stacks 113 may be configured to interwork with LB 130. The client OSs $112_1$-$112_N$ also support a plurality of application clients (ACs) $115_1$-$115_N$ (collectively, ACs 115), respectively. The ACs 115 of the clients 110 may support respective instances of an application provided by the servers 120. The client OSs 112 may be configured to support application layer communications, for the application of the ACs 115, using TCP and any other suitable communication protocols. For example, the clients 110 may be end user devices (e.g., desktop computers, laptop computers, tablet computers, smartphones, or the like), network devices, machines for use in machine-to-machine communications, or the like.

The servers $120_1$-$120_N$ include a plurality of server operating systems (OSs) $122_1$-$122_N$ (collectively, server OSs 122). The server OSs $122_1$-$122_N$ include a plurality of TCP stacks $123_1$-$123_N$ (collectively, TCP stacks 123), respectively, that may be configured to support TCP communications by servers $120_1$-$120_N$. The TCP stacks 123 may be configured to interwork with LB 130. The server OSs $122_1$-$122_N$ may support a plurality of application servers (ASs) $125_1$-$125_N$ (collectively, ASs 125), respectively. The ASs 125 of the servers 120 may support respective instances of an application which may be used by the ACs 115 of the clients 110. The server OSs 122 may be configured to support application layer communications, for the application of the ASs 125, using TCP and any other suitable communication protocols. The server OSs 122 may be MICROSOFT WINDOWS-based OSs, LINUX-based OSs, or the like.

The servers 120 may be implemented in any suitable manner. For example, at least one of the servers 120 may be implemented directly on hardware (e.g., as one or more server devices including one or more dedicated processors and one or more memories), using one or more virtual machines (VMs), or the like. For example, at least one of the servers 120 may be a physical server deployed in a dedicated data center. For example, the servers 120 may be application server instances hosted on virtual machines in a virtualized environment (e.g., a dedicated data center, a cloud-based data center, or the like). In at least some embodiments, a server 120 may be identified using an n-bit server identifier.

The servers 120 may include any suitable numbers of servers (i.e., any suitable value of N). The number N of servers 120 which may be used to provide load balancing for TCP connections also may be dependent on the configurations and capabilities of the LB 130 and the servers 120. For example, communication system 100 may include up to 16 servers (N=16) where the LB 130 includes a single 10G port and each of the 16 servers supports a 1 Gbps network port, such that n=4 bits. Similarly, for example, communication system 100 may include up to 32 servers (N=32) where the LB 130 includes four 10 Gbps network ports and each of the 32 servers supports a 1G port, such that n=5 bits. Similarly, for example, communication system 100 may include up to 32 servers (N=32) where the LB 130 includes a single 100 Gbps network port and each of the 32 servers supports two 1 Gbps network ports, such that n=5 bits. The number N of servers 120 which may be used to provide load balancing for TCP connections also may be dependent on the number of bits n available for identifying the N servers 120. The n bits used to identify the servers 120 may be n address bits of the addresses of the respective servers 120, n server index bits of server index values assigned to the respective servers 120 based on a hash function used by LB 130 for distributing TCP connections across the servers 120, or the like. In general, a given server 120 has one or more addresses associated therewith (e.g., one or more of an IPv4 address, an IPv6 address, an Ethernet Media Access Control (MAC) address, a Session Initiation Protocol (SIP) Uniform Resource Identifier (URI), or any other suitable type of address. The different address types may or may not be configured such that n bits of the respective server addresses of the servers 120 are unique, which may dictate use of n bits of the server addresses (e.g., for an address type for which n unique bits are available within the set of addresses such that the servers 120 may be uniquely identified) or n bits of the server indices (e.g., for an address type for which n unique bits are not available within the set of addresses for uniquely identifying the servers 120) to perform TCP load balancing. It will be appreciated that various other numbers of servers 120 may be used and, thus, that various other values of n may be supported. It also will be appreciated that the number of servers used or active at a given moment can be less than N.

The clients 110 and servers 120, as discussed herein, support an application. The application may be any suitable type of application which may be supported using TCP connections. The application may require or allow use of TCP keep-alive packets (e.g., using a WebSocket-based application or any other type of application which may utilize exchanges of TCP keep-alive packets between clients 110 and servers 120). For example, the application may be an application used by smartmeter appliances to periodically report the actual energy consumption of respective buildings to a set of servers in the network, an application used by smartphones to periodically provide location information (e.g., over HTTP) to a set of servers in the network, application supporting an IP telephony service in which clients are waiting to receive incoming calls and must traverse a Network Address Translation (NAT) device between the client and the IP telephony server, or the like. It will be appreciated that various other types of applications may be supported. The clients 110 and servers 120 may support application layer communications between the ACs 115 of clients 110 and the ASs 125 of servers 120 using various types of communication capabilities. For example, the clients 110 and the servers 120 may support various communication stacks, communication protocols, and the like. More specifically, the client OSs 112 of the clients 110 and the server OSs 122 of the servers 120 may support communications capabilities which may or may not be used to transport application layer communications between the ACs 115 of the clients 110 and the ASs 125 of the servers 120. For example, the client OSs 112 of the CDs 110 and the server OSs 122 of the servers 120 may support communications at various communication layers of the Open Systems Interconnection (OSI) model that are below the application layer; namely, at one or more of the presentation layer (e.g., using Multipurpose Internet Mail Extensions (MIME), External Data Representation (EDR), or any other suitable presentation layer protocols or communication capabilities), the session layer (e.g., using Real-Time Transport Protocol (RTP), Point-To-Point Tunneling Protocol (PPTP), or any other suitable session layer protocols or communication capabilities), the transport layer (e.g., using User Datagram Protocol (UDP), Stream Control Transmission Protocol (SCTP), or any other suitable transport layer protocols or communication capabilities), the network layer (e.g., using Internet Protocol (IP), Internet Control Message Protocol (ICMP), or any other suitable network layer protocols or communication capabilities), the data link layer (e.g., using Generic Framing Procedure (GFP), Asynchronous Transfer Mode (ATM), or any other suitable data link layer protocols or communication capabilities), or the physical layer (e.g., using Synchronous Optical Network (SON), Passive Optical Network (PON), or any other suitable physical layer protocols or communication capabilities).

The LB 130 is configured to provide stateless load balancing of TCP connections established between the client OSs 112 and the server OSs 122, such that the TCP connections of the client OSs 112 are statelessly balanced across the servers 120. The LB 130 is configured to receive TCP connection requests from client OSs 112 of clients 110 and to dynamically distribute the TCP connection requests and, thus, the TCP connections, across the servers 120. The LB 130 also is configured to ensure that packets for a given TCP connection of a client OS 112 consistently go to the server 120 selected to handle the TCP connection request and with which the TCP connection is established for the client OS 112. In this manner, LB 130 is configured to support application layer communications for the application of the ACs 115 and the ASs 125 using TCP and any other suitable communication protocols (e.g., using various layers of the OSI model of communication layers).

The LB 130 is configured to provide various functions related to stateless load balancing of TCP connections across the servers 120. In at least some embodiments, LB 130 may be configured to perform stateless load balancing of TCP connections across the servers 120 based on server configuration information for servers 120, including updating the server configuration information for the servers 120 in response to changes associated with the servers 120 (e.g., new server 120 added, existing server 120 failed or removed, or the like) such that changes to the servers 120 supporting TCP connections may be detected and, thus, TCP connections may be appropriately handled (e.g., reconnected, terminated, or the like) based on the changes associated with the servers 120. In at least some embodiments, LB 130 may be configured to statelessly recognize TCP keep-alive packets (e.g., in order to distinguish TCP keep-alive packets from other types of TCP packets), such that the different packet types may be appropriately handled by the LB 130 (e.g., filtering TCP keep-alive packets in a manner for reducing the number of TCP keep-alive packets exchanged end-to-end on TCP connections). The LB 130 may be configured to provide various other related functions in support of stateless balancing of TCP connections across the servers 120.

The LB 130 includes a processor 132 and a memory 133 communicatively connected to processor 132. The memory 133 stores one or more stateless TCP connection load balancing programs 134 which may be retrieved from memory 133 by processor 132 and executed by processor 132 in order to provide functions for stateless load balancing of TCP connections as discussed herein. The memory 133 also stores server configuration information 135 which may be used by the stateless TCP connection load balancing program(s) 134 to provide functions for stateless load balancing of TCP connections as discussed herein. The memory stores one or more stateless TCP keep-alive packet recognition and filtering programs 136 which may be retrieved from memory 133 by processor 132 and executed by processor 132 in order to provide functions for stateless recognition and filtering of TCP keep-alive packets as discussed herein. The memory 133 may store any other programs or data which may be suitable for use in providing functions of LB 130 depicted and described herein.

The LB 130 may be implemented in any suitable manner. For example, the LB 130 may be implemented directly on hardware (e.g., as a one or more load balancer devices including one or more dedicated processors and one or more memories), using one or more virtual machines (VMs), or the like. For example, the LB 130 may be a physical server deployed in a dedicated data center. For example, the LB 130 may be a load balancer instance hosted on one or more virtual machines in a virtualized environment (e.g., in a dedicated data center, in a cloud-based arrangement, or the like). The LB 130 may be implemented and deployed in any other manner suitable for enabling LB 130 to provide the various functions depicted and described herein. The LB 130 has at least one address associated therewith (e.g., an IP address, Ethernet MAC address, or the like). The LB 130 is stateless and its stateless nature may provide various advantages. For example, the stateless nature of LB 130 enables LB 130 to be deployed in various ways which enable the LB 130 to be scaled without requiring corresponding increases in memory. For example, the stateless nature of LB 130 enables LB 130 to recover from various events or conditions (e.g., temporary failures, being moved to a different host machine, or the like) without disrupting existing TCP connections. The LB 130, in at least some embodiments in which the bottleneck to scalability of LB 130 is network I/O throughput, may be deployed in a manner for overcoming (or at least lessening the impact of) network I/O throughput bottleneck (e.g., co-locating the stateless TCP connection load balancer with one or more other network functions which are memory or CPU bound).

As discussed herein, in at least some embodiments the LB 130 may be configured to perform stateless load balancing of TCP connections across the servers 120 based on server configuration information for servers 120, including updating the server configuration information for the servers 120 in response to changes associated with the servers 120 (e.g., new server 120 added, existing server 120 failed or removed, or the like) such that changes to the servers 120 supporting TCP connections may be detected and, thus, TCP connections may be appropriately handled (e.g., reconnected, terminated, or the like) based on the changes associated with the servers 120. It will be appreciated that at least some such embodiments are particularly well-suited for use in a cloud-based environment in which the set of servers 120 available to handle application processing requests from clients 110 may change dynamically (e.g., in a controlled manner based on changes in demand that may cause addition of new servers 120 or removal of existing servers 120, due to crashes of servers 120, due to network issues, or the like, as well as various combinations thereof), but also may be used in various other types of environments.

The LB 130 is configured to manage the set of servers 120 available for use in load balancing TCP connections of the clients 110. The LB 120 may be configured to manage the set of servers 120 available for use in load balancing TCP connections of the clients 110 using server configuration information that includes (1) a first array which maps potential hash values of a hash function used by the LB 130 to server index values associated with the servers 120 and (2) a second array which maps the server index values associated with the servers 120 to the addresses (e.g., IP, Ethernet, or the like) of the servers 120. It will be appreciated that although primarily depicted and described with respect to use of two arrays to manage the set of servers 120 available for use in load balancing TCP connections of the clients 110, LB 130 may be configured to use fewer or more arrays to manage the set of servers 120 available for use in load balancing TCP connections of the clients 110. It will be appreciated that although primarily depicted and described with respect to use of arrays to manage the set of servers 120 available for use in load balancing TCP connections of the clients 110, LB 130 may be configured to use any other suitable type(s) of data structure(s) to manage the set of servers 120 available for use in load balancing TCP connections of the clients 110.

The LB 130 maintains the first array which maps (1) potential hash values of a hash function used by the LB 130 to (2) server index values associated with the servers 120. The first array has a length A (i.e., supports A entries for mapping potential hash values of the hash function used by the LB 130 to the server index values associated with the servers 120. The hash may be computed over one or more header fields of TCP packets to be received and processed by LB 130 (e.g., over one or more of the source IP address (IPv4 or IPv6), the client source port, or the server destination port). The LB 130 may be configured to balance TCP connections across the servers 120 evenly or based on weightings of the servers 120. In either case, respective numbers of entries of the first array may be assigned to respective servers 120 in a manner for achieving the desired balancing of TCP connections across the servers 120. The various possibilities for configurations of the first array may be better understood with respect to the following example.

In a first example for a configuration of the first array, the first array includes sixty-four (64) entries for handling mappings to server indices of four (4) servers 120. In this example, the first, second, third, and fourth servers 120 are all weighted the same, such that the four servers 120 are expected to handle the same number of TCP connections. In this example, each of the four servers 120 will have sixteen (16) of the sixty-four entries of the first array associated therewith (e.g., sixteen entries including one or more different hash values may be mapped to a first server index value of the first server 120, sixteen entries including one or more different hash values may be mapped to a second server index value of the second server 120, sixteen entries including one or more different hash values may be mapped to a third server index value of the third server 120, and sixteen entries including one or more different hash values may be mapped to a fourth server index value of the second server 120).

In a second example for a configuration of the first array, the first array includes a number of entries for handling mappings to server indices of four servers 120 where the first, second, third, and fourth servers have weights of 2, 1, 1, and 1, respectively, such that the first server 120 is expected to handle twice the number of TCP connections as each of the second, third, and fourth servers 120. In this example, a value of ten (10) may be used for length A, such that the first server 120 has four entries in which four hash values map to a first server index value of the first server 120, the second server 120 has two entries in which two hash values map to a second server index value of the second server 120, the third server 120 has two entries in which two hash values map to a third server index value of the third server 120, and the fourth server 120 has two entries in which two hash values map to a fourth server index value of the fourth server 120. Similarly, in this example, a value of two hundred may be used for A, such that the first server 120 has eighty (80) entries in which eighty hash values map to a first server index value of the first server 120, the second server 120 has forty entries in which forty hash values map to a second server index value of the second server 120, the third server 120 has forty entries in which forty hash values map to a third server index value of the third server 120, and the fourth server 120 has forty entries in which forty hash values map to a fourth server index value of the fourth server 120.

Thus, it will be appreciated that the first array may be configured using any suitable weights of servers 120, any suitable numbers of different hash values supported by the hash function, any suitable numbers of hash values used for the respective servers 120, any suitable numbers of entries A of the first array, or the like. It also will be appreciated that the hash values associated with a given server 120 may be the same or different for the given server 120 (e.g., depending on the total number of possible hash values possible given the hash function used, the header field(s) used to compute the hash values, the number of potential values for the header field(s) used to compute the hash values, or the like, as well as various combinations thereof). It will be appreciated that the total number of entries A of the first mapping may depend on the total number of possible hash values possible given the hash function used, the header field(s) used to compute the hash values, the number of potential values for the header field(s) used to compute the hash values, or the like, as well as various combinations thereof). In at least some embodiments, the total number of entries A of the first array may be chosen in a manner tending to increase the number of combinations of server weights that distribute evenly across the first array (e.g., A=2*3=6 entries would work well for two servers with allowed server weights of 1 or 2 since the first array may be arranged such that (1) the two servers are given three entries each (e.g., where both servers have a server weight of 1 or both servers have a server weight of 2) or (2) one of the servers (with a weight of 2) is given four entries and the other of the servers (with a weight of 1) is given two entries).

The LB 130 maintains the second array which maps the server index values associated with the servers 120 to the addresses (e.g., IP, Ethernet, or the like) of the servers 120. In the case in which a server 120 has a single server index value associated therewith, the second array may include a single entry for the server 120 which maps that server index value to the address of the server 120. In the case in which a server 120 has multiple server index values associated therewith, the second array may include one or more entries for the server 120 which map those server index value to the address of the server 120.

The servers 120 and LB 130 may be configured to provide various functions in support of stateless load balancing by LB 130 of TCP connections between the clients 110 and the servers 120. The LB 130 is configured to receive and process a TCP SYN packet from a client 110, to form thereby a modified TCP SYN packet, in a manner for enabling LB 130 to statelessly control which of the servers 120 will handle the TCP connection for the client 110 (an exemplary embodiment is depicted and described with respect to FIG. 2). The server 120 selected to handle the TCP connection for the client 110 is configured to receive and process the modified TCP SYN packet from LB 130 in a manner for enabling LB 130 to statelessly control consistent delivery of TCP packets for the TCP connection to the server 120 selected to handle the TCP connection for the client 110 (an exemplary embodiment is depicted and described with respect to FIG. 3). The LB 130 is configured to receive additional TCP packets for the TCP connection from the client 110 and to statelessly control consistent delivery of TCP packets for the TCP connection to the server 120 selected to handle the TCP connection for the client 110 assuming that the server 120 selected to handle the TCP connection for the client 110 has not changed (an exemplary embodiment is depicted and described with respect to FIG. 4). The servers 120 and LB 130 may be configured to provide various other functions in support of stateless load balancing by LB 130 of TCP connections between the clients 110 and the servers 120, as discussed in additional detail below.

Figure 2:
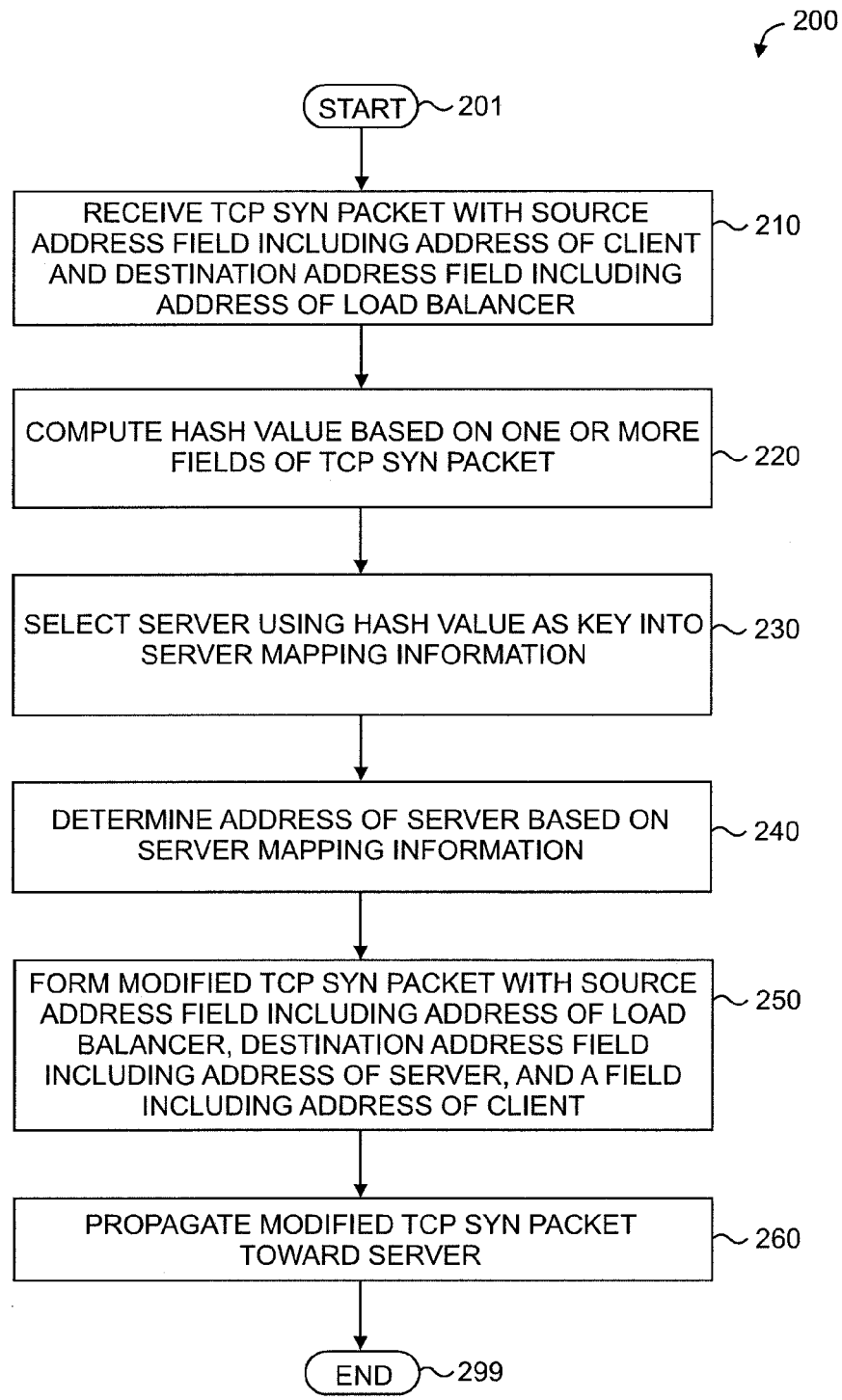
FIG. 2 depicts one embodiment of a method for processing a TCP SYN packet of a client at a load balancer to form a modified TCP SYN packet for a server selected by the load balancer to provide the TCP connection for the client.

FIG. 2 depicts one embodiment of a method for processing a TCP SYN packet of a client at a load balancer to form a modified TCP SYN packet for a server selected by the load balancer to provide the TCP connection for the client. Thus, it will be appreciated that the steps of method 200 may be performed by the load balancer (e.g., LB 130 depicted and described with respect to FIG. 1). It will be appreciated that, although primarily depicted and described as being performed serially, at least a portion of the steps of method 200 may be performed contemporaneously or in a different order than presented in FIG. 2.

At step 201, method 200 begins.

At step 210, a TCP SYN packet is received from a client. The TCP packet has only the SYN flag set and, thus, is a TCP SYN packet. The TCP SYN packet includes a source address field that includes a client address of the client which sent the TCP SYN packet and a destination address field which includes an address of the load balancer.

At step 220, a hash value is computed for the TCP SYN packet based on one or more fields of the TCP SYN packet. The one or more fields may include one or more of source address (e.g., source IP address), source port, destination address, destination port, or the like. The hash value is computed using a hash function that is used as the basis for generating entries of the first array that is maintained by the load balancer.

At step 230, a server is selected using the hash value as a key into server mapping information maintained by the load balancer. Namely, the server may be selected by using the hash value as a key into the first array in order to identify the server index of one of the servers to be used to provide the TCP connection for the client (and, thus, to which the TCP SYN packet is to be routed). The server is selected from among a plurality of servers available to handle the TCP connection for the client.

At step 240, a server address of the server is determined based on the server mapping information. Namely, the server address of the server may be determined by using the server index of the selected server as a key into the second array which includes mappings of server indices to server addresses. The server address of the server may be any suitable type of address (e.g., an IPv4 address, an IPv6 address, an Ethernet MAC address, a SIP URI, or any other suitable type of address).

At step 250, a modified TCP SYN packet is formed based on the received TCP SYN packet.

The modified TCP SYN packet may be formed by modifying the received TCP SYN packet to form the modified TCP SYN packet or generating the modified TCP SYN packet.

The modified TCP SYN packet includes a source address field that includes an address of the load balancer and a destination address field which includes the server address of the server.

The modified TCP SYN packet also includes the client address of the client. The client address of the client may be inserted in any suitable location within the modified TCP SYN packet, such as within the ACK field of the modified TCP SYN packet (e.g., for an IPv4 address of the client), within a TCP option header field of the modified TCP SYN packet (e.g., for an IPv6 address of the client), within a trailer field of the modified TCP SYN packet, or the like. The inclusion of the client address facilitates stateless control over the TCP connection by the load balancer.

The modified TCP SYN packet may include one or more timestamps. For example, the one or more timestamps may include one or more of a hardware timestamp generated at the time the TCP SYN packet was received from the network, the current time as determined by a hardware or software clock, a logical clock value which increases monotonically, or the like. The LB 130 may insert the one or more timestamps into the modified TCP SYN packet by inserting a standard TCP timestamp option field (e.g., as defined by RFC 1323), modifying a received timestamp header from client 110, inserting a custom TCP option header, insert the timestamp header into the payload of the SYN packet, or the like, as well as various combinations thereof. More generally, LB 130 may use any field(s) or method(s) suitable for communicating the one or more timestamp values to the server 120.

The modified TCP SYN packet may include the n bits of the server index of the selected server. The n bits of the server index may be inserted into the modified TCP SYN packet at any suitable location (e.g., in the upper n bits of the sequence number of the TCP SYN packet, in n bits of a timestamp value inserted as a TCP option header of the TCP SYN packet, or the like). The n bits of the server index of the selected server may be used by the server to replace the upper n bits of its initial sequence number (e.g., as discussed with respect to FIG. 3). In at least some embodiments, the value of n may be constant within the system (e.g., the value of n is hardcoded into the load balancer and the server, such that the load balancer does not dynamically modify the number of servers over which TCP connections may be load balanced). In at least some embodiments, the value of n may be dynamic within the system (e.g., the value of n is not hardcoded into the load balancer or the server, such that the load balancer may be configured to dynamically modify the number of servers over which TCP connections may be load balanced). In at least some embodiments in which the value of n may be dynamic within the system, the modified TCP SYN packet also may include the size of the n-bit server index (i.e., the value of n), such that the size of the n-bit server index is available for use by the server in replacing the upper n bits of its initial sequence number with the n bits of the n-bit server index. The size of the n-bit server index may be inserted into the modified TCP SYN packet in any suitable location. An advantage of at least some such embodiments is that the server addresses need not be unique in any n bits (e.g., useful when fixed Ethernet MAC addresses and certain other address types are used). Another advantage of at least some such embodiments is that it is expected to be more efficient to compare n bits from the ACK field of a TCP packet with the server index value found based on the hash value calculated for the TCP packet (instead of comparing n bits from the server address, which may require a second memory lookup to the second array of the server configuration information), as discussed hereinabove and depicted and described with respect to FIG. 4. It is noted that, in at least some such embodiments, when a first server fails and a second server takes the place of the failed first server, the load balancer uses a different server index for the second server rather than only replacing the address of the first server with the address of the second server (such that subsequently received TCP keep-alive packets from TCP connections to the first server will properly detect that the server has changed, because the server index comparison yields a difference).

The modified TCP SYN packet may include an indication to the server that the server is to insert n bits of a server address of the server into the TCP SYN+ACK packet that the server sends in response to receiving the TCP SYN packet from the load balancer. The address of the server may include an IPv4 address of the server, an IPv6 address of the server, an Ethernet address of the server, or any other suitable address of the server.

At step 260, the modified TCP SYN packet is propagated toward the server. The processing of the modified TCP SYN packet by the server may be performed as depicted and described with respect to FIG. 3.

At step 299, method 200 ends.

It will be appreciated that, although primarily depicted and described with respect to an embodiment in which server selection for TCP connection load balancing is performed based on one or more fields of the TCP SYN packet, in at least some embodiments, server selection for TCP connection load balancing may be performed based on server performance information associated with one or more servers of the set of servers available for selection. The server performance information for a server may include information indicative of the current load on the server, response time information associated with the server (e.g., average response time, maximum response time, or the like), or the like, as well as various combinations thereof. The server performance information may be obtained by the load balancer based on feedback from the servers that is inserted into TCP SYN+ACK packet sent from the servers to clients via the load balancer (e.g., as described with respect to FIG. 3). The server performance information may be obtained by the load balancer in any other suitable manner. The server performance information may be maintained by the load balancer as a separate set of information, as part of the server configuration information maintained by the load balancer, or the like, as well as various combinations thereof. The load balancer may use the server performance information for load balancing of TCP connections in place or in addition to use of one or more fields of the TCP SYN packet.

Figure 3:
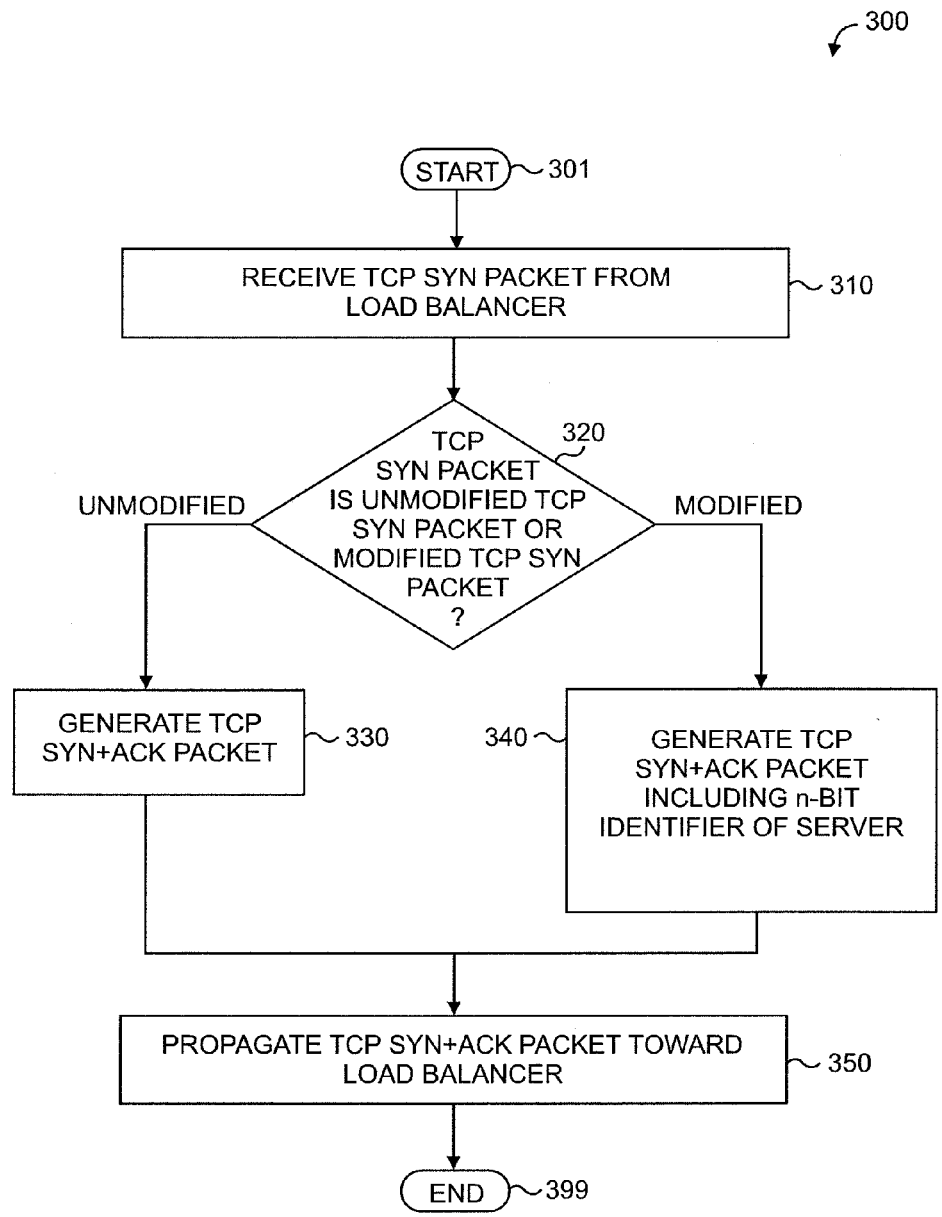
FIG. 3 depicts one embodiment of a method for processing a TCP SYN packet of a load balancer at a server selected by the load balancer to provide a TCP connection for a client.

FIG. 3 depicts one embodiment of a method for processing a TCP SYN packet of a load balancer at a server selected by the load balancer to provide a TCP connection for a client. Thus, it will be appreciated that the steps of method 300 may be performed by a server (e.g., a server 120 depicted and described with respect to FIG. 1). It will be appreciated that, although primarily depicted and described as being performed serially, at least a portion of the steps of method 300 may be performed contemporaneously or in a different order than presented in FIG. 3.

At step 301, method 300 begins.

At step 310, a TCP SYN packet is received from a load balancer. The server is not immediately aware that a modified TCP SYN packet has been received (as opposed to an unmodified TCP SYN packet that may have been routed to the server without traversing the load balancer). In the case of a modified TCP packet, the modified TCP packet may be generated by the load balancer as depicted and described with respect to FIG. 2.

At step 320, a determination is made as to whether the TCP SYN packet is an unmodified TCP SYN packet (i.e., not sent by the load balancer) or a modified TCP SYN packet (i.e., sent by the load balancer).

The server may determine whether the TCP SYN packet is an unmodified TCP SYN packet or a modified TCP SYN packet based on information regarding the manner in which the load balancer processes TCP SYN packets to form modified TCP SYN packets (e.g., the location within the modified TCP packet at which the load balancer inserts the client address of the client).

For example, in an embodiment in which the load balancer forms a modified TCP SYN packet by adding the client address to the ACK field, a determination that the ACK field includes a value of zero results in a determination that the TCP SYN packet is an unmodified TCP SYN packet whereas a determination that the ACK field includes a non-zero value results in a determination that the TCP SYN packet is a modified TCP SYN packet.

Similarly, for example, in an embodiment in which the load balancer forms a modified TCP SYN packet by adding the client address in a TCP options field, a determination that the TCP SYN packet does not include a TCP options field results in a determination that the TCP SYN packet is an unmodified TCP SYN packet whereas a determination that the TCP SYN packet does include a TCP options field results in a determination that the TCP SYN packet is a modified TCP SYN packet.

It will be appreciated that multiple types of such determinations may need to be made (e.g., where multiple client types (e.g., IPv4 and IPv6 clients) are supported and different types of modifications are made to TCP SYN packets at the load balancer for the different client types). For example, a determination that the ACK field of the TCP SYN packet includes a value of zero may not immediately result in a determination that the TCP SYN packet is an unmodified TCP SYN packet; rather an additional check may need to be performed to determine whether the TCP SYN packet includes a TCP options field which might be used by an IPv6 client but not an IPv4 client. Similarly, for example, a determination that the TCP SYN packet does not include a TCP options field may not immediately result in a determination that the TCP SYN packet is an unmodified TCP SYN packet; rather an additional check may need to be performed to determine whether the ACK field of the TCP SYN packet includes a value of zero or a non-zero value. It will be appreciated that the order in which multiple such determinations are made may be selected based on the type of modification to the TCP SYN packet that is expected to be more prevalent.

If the TCP SYN packet is an unmodified TCP SYN packet, method 300 proceeds to step 330. If the TCP SYN packet is a modified TCP SYN packet, method 300 proceeds to step 340.

At step 330, the unmodified TCP SYN packet is processed and a TCP SYN+ACK packet is generated based on the unmodified TCP SYN packet. The unmodified TCP SYN packet is processed using packet processing that is typically performed by a server for a TCP SYN packet. The typical processing of a TCP SYN packet and associated generation of a TCP SYN+ACK packet by a server will be understood by one skilled in the art. From step 330, method 300 proceeds to step 350.

At step 340, the modified TCP SYN packet is processed and a TCP SYN+ACK packet is generated based on the modified TCP SYN packet. The modified TCP SYN packet is processed using packet processing that is typically performed by a server for a TCP SYN packet, but with at least one exception that the TCP SYN+ACK packet includes an identifier of the server (e.g., n bits of an address of the server, the n-bit server index of the server, or the like).

In at least some embodiments, the server replaces the upper n bits of its initial sequence number with the n bits of its own server address (e.g., IPv4 address, IPv6 address, Ethernet address, or the like), thereby leaving 32-n bits for the initial sequence number. The server also may clear the next upper two bits of its randomly generated initial sequence number (to delay the moment at which the sequence number wraps into the n upper bits), thereby leaving 32-n-2 bits for the initial sequence number. It is noted that the number of bits for the initial sequence number may be reduced to 24-n-2 random bits if TCP SYN cookies are used. The server may replace the upper n bits of its initial sequence number with the n bits of its own server address based on an indication detected in the TCP SYN packet. From step 340, method 300 proceeds to step 350.

In at least some embodiments, the server replaces the upper n bits of its initial sequence number with the n bits of its own server index (from server configuration information maintained on the load balancer). The server may determine the n bits of its own server index from the modified TCP SYN packet received from the load balancer (e.g., inserted into the modified TCP SYN packet by the load balancer, as discussed with respect to method 200 of FIG. 2). As discussed with respect to method 200 of FIG. 2, the value of n may be constant or dynamic within the system. In at least some embodiments in which the value of n may be dynamic within the system, the server may determine the size of the n-bit server index (i.e., the value of n) from the modified TCP SYN packet received from the load balancer for use by the server in replacing the upper n bits of its initial sequence number with the n bits of the n-bit server index. The size of the n-bit server index may be determined from any suitable location within the modified TCP SYN packet (which may depend on placement of the size of the n-bit server index within the modified TCP SYN packet by the load balancer, as depicted and described with respect to FIG. 2). As described with respect to FIG. 2, various advantages may be realized from use of the n-bit server index (e.g., the server addresses need not be unique in any n bits, it is expected to be more efficient to compare n bits from the ACK field of a TCP packet with the server index value found based on the hash value calculated for the TCP packet, or the like). It is noted that, in at least some such embodiments, when a first server fails and a second server takes the place of the failed first server, the load balancer uses a different server index for the second server such that the change from the first server to the second server can be detected at the load balancer when subsequent keep-alive packets are received at the load balancer. It will be appreciated that, although primarily depicted and described with respect to embodiments in which the server replaces the upper n bits of its initial sequence number with the n bits of its own server index, in at least some embodiments the server may instead use a different field of the TCP SYN+ACK packet (e.g., the timestamp option header or any other suitable field) to store the n bits of its own server index, thereby avoiding the constraint on the maximum number of bytes which may be sent by the server due to use of part of the server sequence number to convey the n bits of the server index of the server.

In at least some embodiments, the server copies information from the modified TCP SYN packet into the TCP SYN+ACK packet. The server may copy the client address of the client from the modified TCP SYN packet into the TCP SYN+ACK packet. The server may copy one or more timestamps from the modified TCP SYN packet into the TCP SYN+ACK packet. The server may copy information from the modified TCP SYN packet into the TCP SYN+ACK packet using one or more option headers.

In at least some embodiments, the server inserts performance-indicative information for the server into the TCP SYN+ACK packet for the TCP connection. The performance-indicative information for the server includes information which may be used by the load balancer to determine server performance information for the server. The server performance information for a server may include information indicative of the current load on the server, response time information associated with the server (e.g., average response time, maximum response time, or the like), or the like, as well as various combinations thereof. Similarly, the performance-indicative information for the server that is included within TCP SYN+ACK packet for the TCP connection may include a current server load value of the server (e.g., as a value indicative of a percentage, 0%-100%, of the current server system load) for use by the load balancer in determining the information indicative of the current load on the server, a timestamp for use by the load balancer in determining a response time of the server for the TCP connection where the response time of the server for the TCP connection may then be used by the load balancer in determining response time information associated with the server, or the like. The load balancer may receive performance-indicative information for a set of servers in TCP SYN+ACK packets received from the set of servers and use the performance-indicative information to update server performance information maintained by the load balancer (e.g., by updating server performance information maintained by the load balancer separate from the server configuration information maintained by the load balancer, by modifying weights assigned to the servers in the server configuration information maintained by the load balancer, or the like). The load balancer may use the server performance information maintained by the load balancer to perform load balancing of TCP connections across the set of servers (e.g., as a basis for server selection within the context of method 200 of FIG. 2).

At step 350, the TCP SYN+ACK packet is propagated toward the load balancer.

At step 399, method 300 ends.

Figure 4:
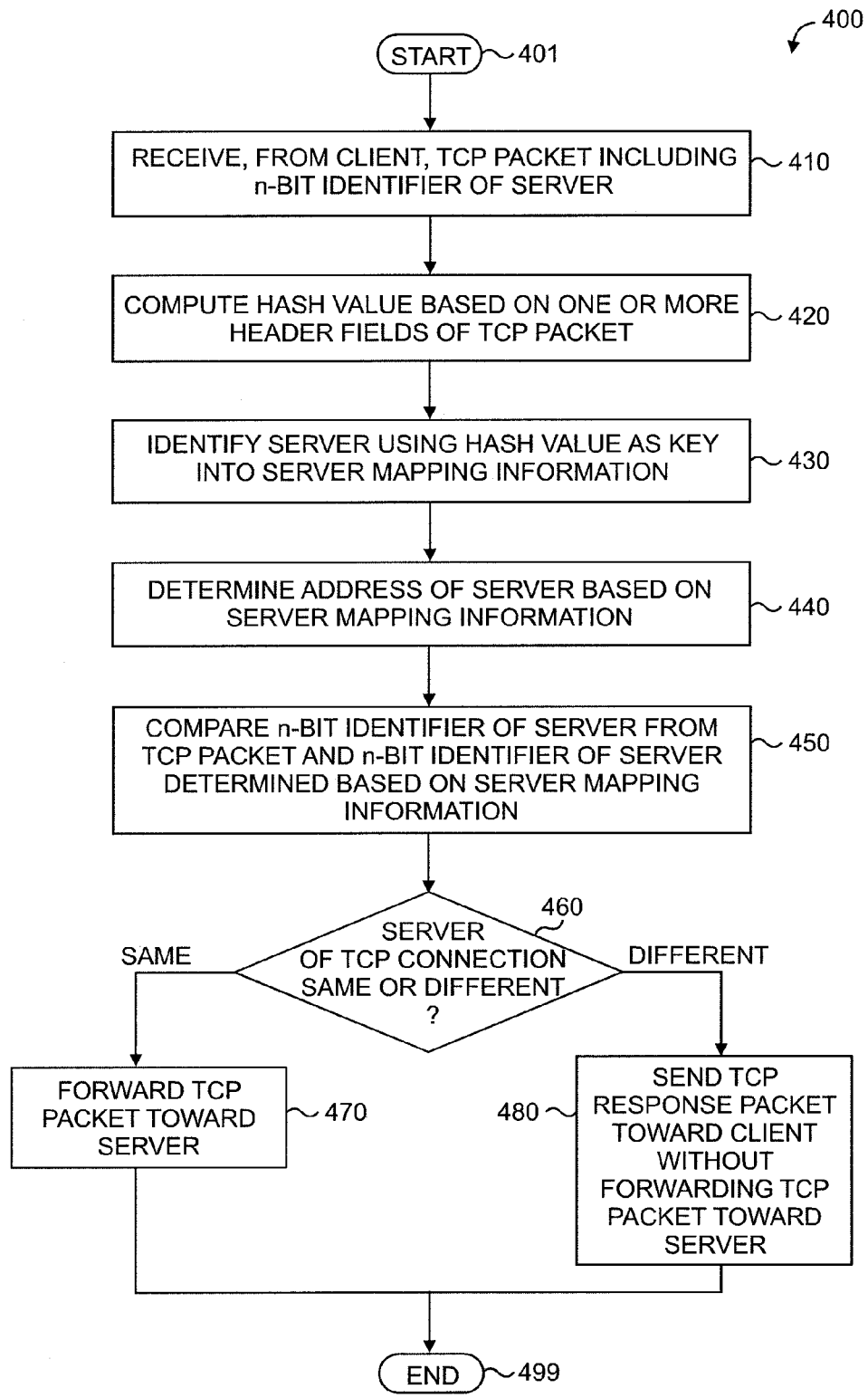
FIG. 4 depicts one embodiment of a method for processing TCP packets of a TCP connection of a client at a load balancer in a manner for statelessly ensuring delivery of packets server selected by the load balancer to provide the TCP connection for the client.

FIG. 4 depicts one embodiment of a method for processing TCP packets of a TCP connection of a client at a load balancer in a manner for statelessly ensuring delivery of packets server selected by the load balancer to provide the TCP connection for the client. Thus, it will be appreciated that the steps of method 400 may be performed by the load balancer (e.g., LB 130 depicted and described with respect to FIG. 1). It will be appreciated that, although primarily depicted and described as being performed serially, at least a portion of the steps of method 400 may be performed contemporaneously or in a different order than presented in FIG. 4.

At step 401, method 400 begins.

At step 410, a TCP packet is received from a client. The TCP packet does not have the SYN flag set and, thus, is a TCP packet other than a TCP SYN packet (and, thus, should be sent to the same server 120 to which the corresponding TCP SYN packet was sent, if possible). The TCP packet is associated with a TCP connection. The TCP packet includes a source address field that includes a client address of the client which sent the TCP packet and a destination address field which includes an address of the load balancer. The TCP packet also includes an n-bit identifier of the server (e.g., n bits of an address of the server, n-bit server index of the server, or the like) inserted by the client based on the modified TCP SYN+ACK packet received at the client from the load balancer (e.g., based on the modified TCP SYN+ACK packet generated as depicted and described with respect to method 300 of FIG. 3). As discussed herein, the n-bit identifier of the server may be included within the TCP packet in the ACK field or in any other suitable location within the TCP packet.

At step 420, a hash value is computed for the TCP packet based on one or more fields of the TCP packet. The one or more fields may include one or more of source address (e.g., source IP address), source port, destination address, destination port, or the like. The hash value is computed using a hash function that is used as the basis for generating entries of the first array that is maintained by the load balancer as well as for computing hash values when TCP SYN packets are received. The use of a consistent hash in this manner is meant to ensure that, when possible, the TCP packets of a TCP connection are consistently routed to the same server selected for the TCP connection when the first hash is computed in response to the TCP SYN packet.

At step 430, a server is identified using the hash value as a key into server mapping information maintained by the load balancer. Namely, the server may be identified by using the hash value as a key into the first array in order to identify the server index of one of the servers to which the TCP packet is to be routed.

At step 440, a server address of the server is determined based on the server mapping information. Namely, the server address of the server may be determined by using the server index of the selected server as a key into the second array which includes mappings of server indices to server addresses.

At step 450, a comparison is performed for determining whether the server of the TCP connection has changed. In at least some embodiments, in which the modified TCP SYN+ACK packet generated by the server includes n bits of the server address as the upper n bits of the initial server sequence number, the upper n bits of the server sequence number from the received TCP packet and the corresponding n bits of the server address determined based on the server mapping information maintained at the load balancer (namely, from the first and second arrays) are compared. In at least some embodiments, in which the modified TCP SYN+ACK packet generated by the server includes the n bits of the server index (e.g., as the upper n bits of the initial server sequence number, within a timestamp option header, or the like), the n bits of the server index from the received TCP packet (again, e.g., as the upper n bits of the server sequence number, within a timestamp option header, or the like), and the corresponding n bits of the server index determined based on the server mapping information maintained at the load balancer (namely, from the first array) are compared. If the compared bits match (a more likely scenario), the server of the TCP connection has not changed (since the TCP SYN packet for the TCP connection was processed and initial server selection was performed by the load balancer). If the compared bits do not match (a less likely scenario), the server of the TCP connection has changed (e.g., due to one or more events or conditions which may cause modifications to the server configuration information maintained by the load balancer).

At step 460, a determination as to whether the server of the TCP connection is the same or different based on the comparison of the upper n bits of the server sequence number and the corresponding n bits of the server address. If the server of the TCP connection is the same, method 400 proceeds to step 470. If the server of the TCP connection is different, method 400 proceeds to step 480.

At step 470, the TCP packet is forwarded toward the server. Although not included within the scope of method 400, it will be appreciated that the server receives the TCP packet from the load balancer and initiates appropriate processing of the TCP packet. The server may process the TCP packet in any suitable manner, which may result in generation of an associated TCP response packet by the server. The server may propagate the TCP response packet to the client indirectly via the load balancer or directly without traversing the load balancer. It will be appreciated that sending TCP response packets directly from the server to the client avoids overhead and delay of processing such TCP response packets at the load balancer. The server may be configured to use direct forwarding of TCP response packets to the client by configuring the server to accept traffic from a common IP address associated with the load balancer without responding to Address Resolution Protocol (ARP) requests for that IP address. From step 470, method 400 proceeds to step 499, where method 400 ends.

At step 480, a TCP response packet is sent toward the client without forwarding the TCP packet to the server. The TCP response packet may be a TCP Reset (RST) packet for causing the client to close the TCP connection and initiate a TCP reconnection, a TCP FIN packet for causing the client to close the TCP connection without initiating a TCP reconnection, or any other suitable type of TCP response packet. Although not included within the scope of method 400, it will be appreciated that the client receives the TCP response packet from the load balancer and initiates appropriate processing of the TCP response packet. From step 480, method 400 proceeds to step 499, where method 400 ends.

At step 499, as noted above, method 400 ends.

The servers 120 and LB 130 also may be configured to provide various additional functions in support of stateless load balancing by LB 130 of TCP connections between the clients 110 and the servers 120.

The server 120 may be configured to monitor the TCP sequence number for the TCP connection with client 110. The server 120 in response to a determination that the TCP sequence number for the TCP connection with client 110 is within a threshold number of bits of the maximum TCP sequence number which may be supported (namely, $2^{(32-n)}$) closes the TCP connection with the client 110 in order to avoid a situation in which the TCP sequence number for the TCP connection overflows into the upper n bits used for the address of the server 120. This implies that a maximum of $2^{(32-n)}$ bytes can be sent by the server 120 over the TCP connection with the client 110 (as well as for any other TCP connection to the server 120. It will be appreciated that this is not expected to be a problem for many types of applications in which a relatively small number of bytes are sent via the underlying TCP connection, such as Session Initiation Protocol (SIP) signaling of WebRTC calls, smartmeter clients reporting measured values to server where the servers only acknowledge reception of the bytes without sending associated responses, or the like). It also will be appreciated that the application being supported by the TCP connection may be configured to handle a failing TCP connection by reconnecting (i.e., the TCP sequence number overflow condition would only be a specific case of a "failure" which might cause initiation of a TCP reconnection). Furthermore, it will be appreciated that such TCP sequence number overflow condition prevention and handling may only be applicable for TCP connections that are load balanced by LB 130 (e.g., for which the associated TCP SYN packet included a non-zero ACK field).

As discussed herein, communication system 100 may be dynamic in that various types of events may result in changes to the server configuration information used by LB 130 to balance TCP connections across the servers 120. For example, server configuration information used by LB 130 to balance TCP connections across the servers 120 may change as a result of changes to server weights of existing servers 120, addition of one or more new servers 120 to communication system 100, unavailability of one or more existing servers 120 within communication system 100 (e.g., due to one or more of a failure(s) of an existing server(s) 120, a removal(s) of an existing server(s) 120, or the like), or the like, as well as various combinations thereof. The LB 130 is configured to continue to be able to perform load balancing of TCP connections while accommodating various types of changes associated with the set of servers 120 across which TCP connections may be balanced.

The LB 130 may be configured to, in response to an indication of availability of a new server 120 in the communication system 100, update its server configuration information (e.g., its mapping of A entries in the first array, updating the mapping of one or more server indices for the new server 120 to the address of the new server 120 in the second array, or the like). The LB 130 may update the first array in a manner tending to minimize the number of entries of the first array that are changed, because any client 110 that has a TCP connection that hashes to one of the changed entries of the first array may have to (1) reconnect from the server 120 to which they were connected to a new server 120 indicated by the changed entry of the first array or (2) terminate the TCP connection without reconnecting. However, since LB 130 is stateless, LB 130 does not know the correct TCP sequence number for the TCP connection and, thus, cannot proactively send a TCP RST packet or a TCP FIN packet to the client 110 until it first receives a packet from the client 110. In other words, this reconnection or termination by a client 110 for the TCP connection will not occur until the next time that a data packet or keep-alive packet is received from the client 110 at the LB 130 for that TCP connection. As such, given that different clients 110 having TCP connections which are to be reconnected to the new server 120 may be expected to have a relatively evenly distribution across the keep-alive interval of the application supported by the new server 120, it is expected that the arrival of TCP reconnection requests of the clients 110 to the new server 120 (for reconnecting existing TCP connections of the client 110 to the new server 120 based on the change to the first array of LB 130) will be relatively evenly distributed across the keep-alive interval, thereby resulting in a relatively smooth window during which the new server 120 receives TCP reconnection requests from the clients 110 and, thus, a relatively smooth transition of the TCP connections to the new server 120. As a result, the fact that the LB 130 is stateless may help to ensure a relatively smooth transition of the TCP connections to the new server 120. In at least some embodiments, in order to further reduce the impact of the addition of the new server 120, LB 130 may be configured to ignore (drop) one or more keep-alive packets received for one or more TCP connections impacted by the addition of the new server 120 (e.g., TCP connections that hash to one of the changed entries of the first array), rather than responding to the associated client(s) 110 with TCP RST or TCP FIN packets, so as to rate-limit the arrival of TCP connections to the new server 120 and, thus, avoid overloading the new server 120. It will be appreciated that, although primarily described with respect to embodiments in which a single new server 120 becomes available within communication system 100, in at least some embodiments multiple new servers 120 may become available within communication system 100 at or about the same time, such that the existing TCP connections that hash to one of the changed entries of the first array may be distributed across the multiple new servers 120.

The LB 130 may be configured to, in response to an indication of unavailability of an existing server 120 in the communication system 100 (e.g., the existing server 120 has failed, the existing server 120 has been dynamically removed, a TCP RST packet has been received from the existing server 120 or from another network element, or the like), update its server configuration information 135 (e.g., updating its mapping of A entries in the first array, removing the mapping of one or more server indices for the existing server 120 to the address of the existing server 120 in the second array, or the like). The LB 130 may update the first array in a manner tending to minimize the number of entries of the first array that are changed, because any client 110 that has a TCP connection that hashes to one of the changed entries of the first array may have to (1) reconnect from the server 120 to which they were connected to a different server 120 indicated by the changed entry of the first array or (2) terminate the TCP connection without reconnecting. However, since LB 130 is stateless, LB 130 does not know the correct TCP sequence number for the TCP connection and, thus, cannot send a TCP RST packet or a TCP FIN packet to the client 110 until it first receives a packet from the client 110. In other words, this reconnection or termination by a client 110 for the TCP connection will not occur until the next time that a data packet or keep-alive packet is received from the client 110 at the LB 130 for that TCP connection. In this situation, however, the existing TCP connections of the server 120 that has become unavailable may be distributed across the remaining servers 120, such that the additional load on the remaining servers 120 is not expected to be an issue (as opposed to the situation in which a new server(s) 120 becomes available and existing TCP connections of a potentially large number of existing servers 120 are all offloaded onto the relatively small number of new servers 120). Thus, it will be appreciated that mechanisms relied upon in the case in which a new server(s) 120 becomes available within communication system 100 may not be necessary (although they may still be used) for the case in which an existing server(s) 120 becomes unavailable within communication system 100.

Figure 5:
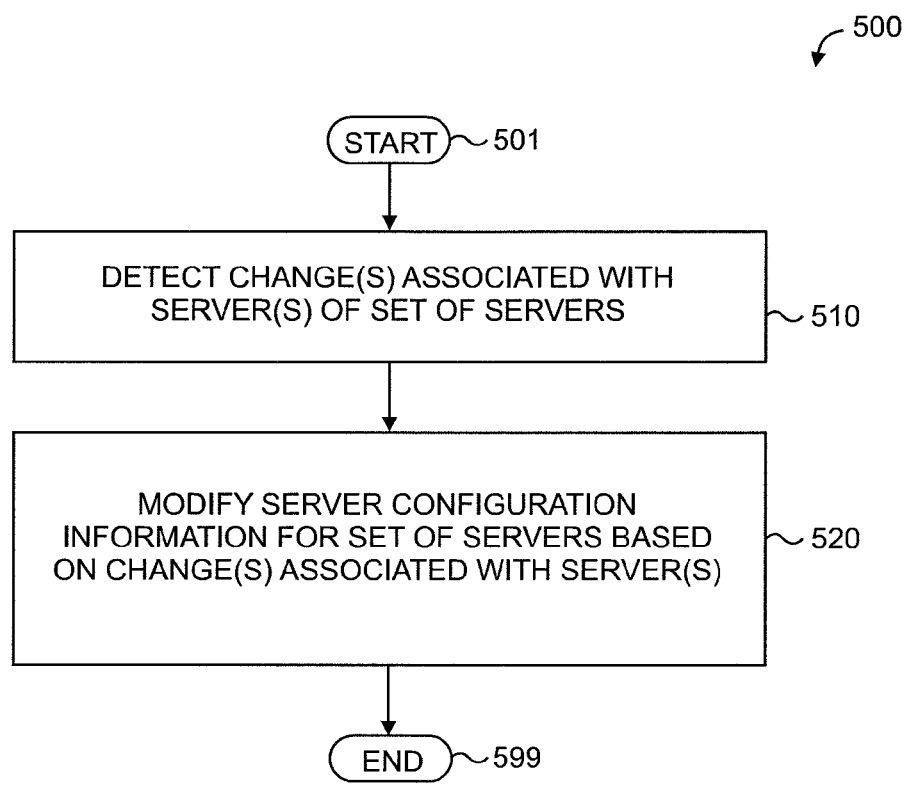
FIG. 5 depicts one embodiment of a method for use by a load balancer in managing server configuration information of a set of servers for use in supporting stateless load balancing of TCP connections across the set of servers.

FIG. 5 depicts one embodiment of a method for use by a load balancer in managing server configuration information of a set of servers for use in supporting stateless load balancing of TCP connections across the set of servers. Thus, it will be appreciated that the steps of method 500 may be performed by the load balancer (e.g., LB 130 depicted and described with respect to FIG. 1). It will be appreciated that, although primarily depicted and described as being performed serially, at least a portion of the steps of method 500 may be performed contemporaneously or in a different order than presented in FIG. 5. At step 501, method 500 begins. At step 510, one or more changes associated with the set of servers are detected. The one or more changes may include a change in weights of the servers, addition of one or more new servers to the set of servers, an error condition associated with one or more servers in the set of servers, failure of one or more servers in the set of servers, removal of one or more servers from the set of servers, or the like. At step 520, server configuration information for the set of servers is modified based on the one or more changes associated with the set of servers. At step 599, method 500 ends. It will be appreciated that method 500 may represent various embodiments related to management of server configuration for use in stateless load balancing of TCP connections across a set of servers.

As described above, a change in configuration of the servers 120 (e.g., change in server weights of the servers 120, additional of a new server(s) 120, unavailability of an existing server(s) 120, or the like) results in a change to the server configuration information that is used by LB 130 to perform load balancing of TCP connections across the servers 120. In at least some embodiments, LB 130 maintains multiple server configurations in memory 133 (rather than simply updating the server configuration information based on the latest configuration of servers 120 and forgetting about the previous configurations of servers 120). The LB 130 also may maintain timestamps for the multiple server configurations (e.g., timestamps indicative of times at which the server configuration changes were made). For example, LB 130 may maintain the x most recent server configurations (or any other suitable combination of multiple server configurations). In at least some such embodiments, upon receiving a TCP packet, LB 130 iteratively performs the check to determine whether the server has changed, using the server configuration information of one or more of the multiple server configurations (e.g., in an order from most recent to least recent), until (a) a match is found or (b) the multiple server configurations have been considered in determining whether the server has changed and a match has not been found for any of the multiple server configurations. For example, within a given iteration, LB 130 may identify a server using the server configuration information of the currently selected server configuration, determine an address of the identified server, and compare the n-bit identified of the server from the TCP packet to the n-bit identified of the server determined from the server configuration information of the currently selected server configuration. It will be appreciated that these steps correspond to steps 430-450 of method 400 of FIG. 4, and, thus, that method 400 of FIG. 4 may be modified to support this type of iterative checking for server changes based on multiple server configurations maintained by LB 130. These types of embodiments allow LB 130 to maintain TCP connections across configuration changes, and to dynamically adjust weights without forcing clients to reconnect existing connections.

Referring back to FIG. 1, it will be appreciated that, as discussed hereinabove with respect to FIG. 1, various applications may utilize TCP keep-alive packets. For example, TCP keep-alive packets may be utilized for applications in which relatively few data packets are expected to be sent and, thus, the TCP connection would timeout in the absence of use of the TCP keep-alive packets. For example, TCP keep-alive packets may be utilized for preventing any Network Address Translation (NAT) device(s) on the path between the client and the server from timing out. It will be appreciated that TCP keep-alive packets also may be used for various other purposes.

In at least some situations, it may be desirable to filter TCP keep-alive packets at some point in the network that is between the client and server ends of a TCP connection, so as to reduce the number of TCP keep-alive packets that need to traverse the entire path between the client and server ends of the TCP connection and to reduce the processing overhead on the server end of the TCP connection for processing of the TCP keep-alive packets.

In at least some such situations, a proxy device that is disposed between two ends of a TCP connection may be used as a proxy for TCP keep-alive packets, where the proxy device is configured to filter TCP keep-alive packets sent from clients such that the TCP keep-alive packets are not forwarded to the associated servers while also issuing TCP keep-alive packets to servers on behalf of clients.

In at least some embodiments, LB 130 may be configured to operate as a proxy for TCP keep-alive packets exchanged between clients 110 and servers 120, thereby reducing the amount of TCP keep-alive packets sent from LB 130 to the servers 120 and reducing the processing overhead on the servers 120 for processing of TCP keep-alive packets from the clients 110.

The LB 130 may operate as a proxy for TCP keep-alive packets exchanged between clients 110 and servers 120 by recognizing and filtering TCP keep-alive packets received from the clients 110 for TCP connections supported by the servers 120.

In at least some embodiments, LB 130 is configured to statelessly recognize TCP keep-alive packets (e.g., in order to distinguish TCP keep-alive packets from other types of TCP packets), such that the different TCP packet types may be appropriately handled by the LB 130 (e.g., filtering TCP keep-alive packets in a manner for reducing the number of TCP keep-alive packets exchanged end-to-end on TCP connections, while allowing other TCP packet types to be forwarded to the appropriate servers 120 such that the associated TCP connections are not impacted).

In general, TCP keep-alive packets may have different characteristics for different TCP implementations (e.g., as described in RFC 1122). For example, TCP keep-alive packets for a TCP connection typically have (1) a payload of zero bytes (e.g., for LINUX-based OSs) or a payload of one byte (e.g., for WINDOWS-based OSs) and (2) a server sequence number for the server 120 of the TCP connection that is one less than the client sequence number of the client 110 of the TCP connection. Furthermore, TCP keep-alive packets also may have characteristics that are the same as or similar to characteristics of one or more other types of TCP packets (e.g., in certain TCP implementations, TCP ACK packets, TCP data packets, and TCP keep-alive packets may have empty payloads), such that it may be difficult to distinguish TCP keep-alive packets from one or more other types of TCP packets. Accordingly, in at least some embodiments, LB 130 may be configured to recognize TCP keep-alive packets in a reliable manner such that LB 130 may properly filter such TCP keep-alive packets without incorrectly filtering other types of TCP packets (e.g., TCP ACK packets, TCP data packets with 0-byte payloads, and the like) which should not be filtered due to the fact that such filtering may disturb the associated TCP connections for which the other types of TCP packets are sent.

The LB 130 may be configured, based on information indicative of one or more characteristics of TCP keep-alive packets for a TCP implementation, to support recognition of TCP keep-alive packets for that TCP implementation.

In at least some embodiments, one or more of the clients 110 may be WINDOWS-based clients (e.g., having a WINDOWS-based client OS 112). In at least some WINDOWS-based TCP implementations, a TCP keep-alive packet includes a one-byte payload of "\0". Thus, in at least some embodiments, LB 130 may be configured to determine whether a received TCP packet is a TCP keep-alive packet (as opposed to some other type of TCP packet) when the TCP packet includes a one-byte payload. For example, LB 130 may be configured to determine a length of the payload of a received TCP packet, determine whether the payload of the TCP packet includes a value of "\0" (or other appropriate value) based on a determination that the length of the payload of the TCP packet is one byte, and determine whether the TCP packet is a TCP keep-alive packet based on the determination as to whether the payload of the TCP packet has a value of "\0" (e.g., identify the TCP packet as being a TCP keep-alive packet when the payload of the TCP packet has a value of "\0" or identify the TCP packet as a being a TCP packet other than a TCP keep-alive packet when the payload of the TCP packet has a value other than "\0").

In at least some embodiments, one or more of the clients 110 may be LINUX-based clients (e.g., having a LINUX-based client OS 112). In at least some LINUX-based TCP implementations, a TCP keep-alive packet includes an empty payload. However, as noted above, some other types of TCP packets also may have empty payloads (e.g., a TCP ACK packet, a TCP data packet with a 0-byte payload, or the like), such that reliable recognition of TCP keep-alive packets for LINUX-based clients is expected to be more difficult than reliable recognition of TCP keep-alive packets for WINDOWS-based clients. Thus, in at least some embodiments, for a given TCP connection between a client 110 and a server 120 via LB 130, the server 120 and LB 130 may be configured to cooperate in a manner for enabling the LB 130 to recognize TCP keep-alive packets on the TCP connection and, thus, to distinguish TCP keep-alive packets on the TCP connection (e.g., to be filtered by LB 130) from other types of TCP packets on the TCP connection (e.g., to be forwarded by the LB 130 to the server 120 for the client 110).

In general, for a TCP implementation in which TCP keep-alive packets include an empty payload, the reliable recognition of TCP keep-alive packets by LB 130 for a TCP connection between a client 110 and a server 120 via the LB 130 is provided via configuration of the server 120 and the LB 130 in a manner that enables the LB 130 to recognize TCP keep-alive packets of the TCP connection. In at least some embodiments, recognition of TCP keep-alive packets by LB 130 may be supported by: (1) configuring the server 120 and the LB 130 to support a parity rule indicative that a first parity (odd or even) is associated with TCP keep-alive packets and a second parity (odd or even, but different than the first parity) is associated with other types of TCP packets (e.g., at those types of TCP packets which may have zero-byte payloads and, thus, may be mistaken by the load balancer for TCP keep-alive packets, (2) configuring the server 120 to evaluate various conditions based on received TCP packets and, where necessary, to manipulate TCP packets sent by the server 120, in order to maintain the parity rule agreed to by the server 120 and the LB 130 for recognition of TCP keep-alive packets, and (3) configuring LB 130 to evaluate various conditions based on received TCP packets in order for determining whether the received TCP packets are TCP keep-alive packets or TCP packets other than TCP keep-alive packets. It will be appreciated that the parity rule configured on the server 120 and the LB 130 may dictate the conditions used by the server 120 and the LB 130 for supporting recognition of TCP keep-alive packets by the LB 130. More detailed descriptions of these and various other related embodiments follow.

The server 120 is configured to select the initial server sequence number for a TCP connection in a particular way that will enable LB 130 to distinguish between a 0-byte TCP keep-alive packet on the TCP connection and other types of 0-byte TCP packets which may be exchanged using the TCP connection (e.g., the 0-byte ACK packet sent by the client 110, a 0-byte data packet which may be sent by the client 110, or the like). An exemplary embodiment is depicted and described with respect to FIG. 6.

Figure 6:
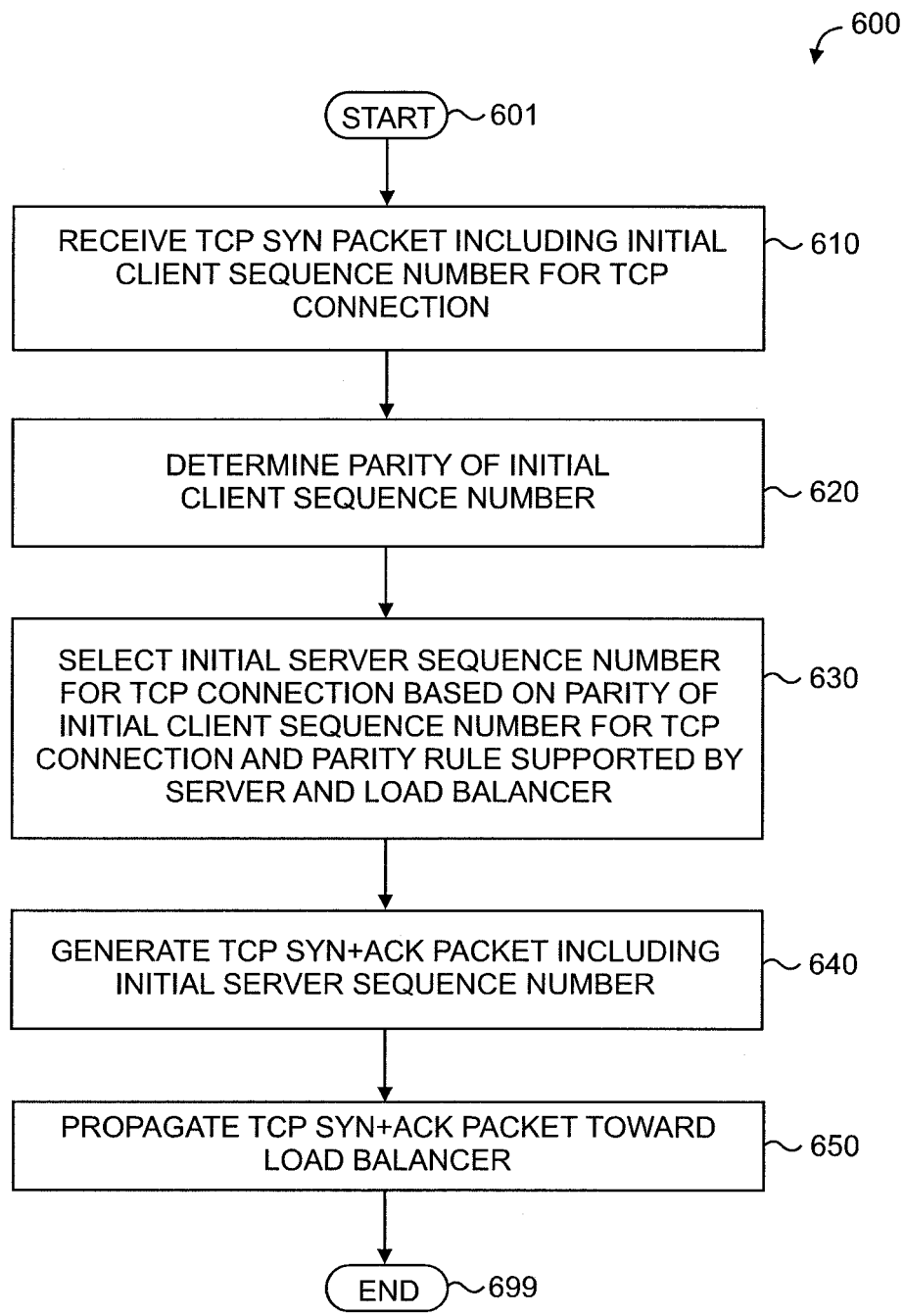
FIG. 6 depicts one embodiment of a method for selecting the initial server sequence number for a TCP connection in a manner enabling a load balancer to recognize TCP keep-alive packets on the TCP connection.

FIG. 6 depicts one embodiment of a method for selecting the initial server sequence number for a TCP connection in a manner enabling a load balancer to recognize TCP keep-alive packets on the TCP connection. It will be appreciated that the steps of method 600 may be performed by a server (e.g., a server 120 depicted and described with respect to FIG. 1). It will be appreciated that, although primarily depicted and described as being performed serially, at least a portion of the steps of method 600 may be performed contemporaneously or in a different order than presented in FIG. 6.

At step 601, method 600 begins.

At step 610, a TCP SYN packet is received. The TCP SYN packet includes an initial client sequence number for the TCP connection.

At step 620, a parity of the initial client sequence number for the TCP connection is determined At step 630, an initial server sequence number is selected for the TCP connection based the parity of the initial client sequence number for the TCP connection and a parity rule supported by the server and the load balancer.

For example, if the parity rule supported by the server and the load balancer indicates that the parity for TCP keep-alive packets is to be odd, then the initial server sequence number is selected to have an odd parity if the parity of the initial client sequence number is odd and is selected to have an even parity if the parity of the initial client sequence number is even. In other words, the initial server sequence number is selected to have the same parity as the least significant bit (LSB, bit#0) of the initial client sequence number from the TCP SYN packet.

For example, if the parity rule supported by the server and the load balancer indicates that the parity for TCP keep-alive packets is to be even, then the initial server sequence number is selected to have an even parity if the parity of the initial client sequence number is odd and is selected to have an odd parity if the parity of the initial client sequence number is even. In other words, the initial server sequence number is selected to have the inverse parity of the LSB (bit#0) of the initial client sequence number from the TCP SYN packet.

For example, the server 120 may select the initial server sequence number, a 32 bit number, as follows: [<n lowest bits of address of server 120><32-n−1 arbitrary bits><parity bit (bit 0)>].

At step 640, a TCP SYN+ACK packet including the initial server sequence number is generated.

At step 650, the TCP SYN+ACK packet is propagated toward the load balancer. It will be appreciated that the TCP SYN+ACK packet including the initial server sequence number also is ultimately propagated from the load balancer to the client, such that the server 120 is able to control the parity of the sum of the SEQ and ACK fields generated by the client 110 via control over the initial server sequence number and control over the amount of response bytes it sends.

At step 699, method 600 ends.

Referring back to FIG. 1, the server 120 is configured to perform processing in order to ensure that a TCP packet that is sent by the server 120 and which might trigger an associated TCP response packet from the client 110 will not cause the TCP response packet that is sent by the client 110 to be wrongly identified by LB 130 as being a TCP keep-alive packet when it is in fact not a TCP keep-alive packet. An exemplary embodiment is depicted and described with respect to FIG. 7.

Figure 7:
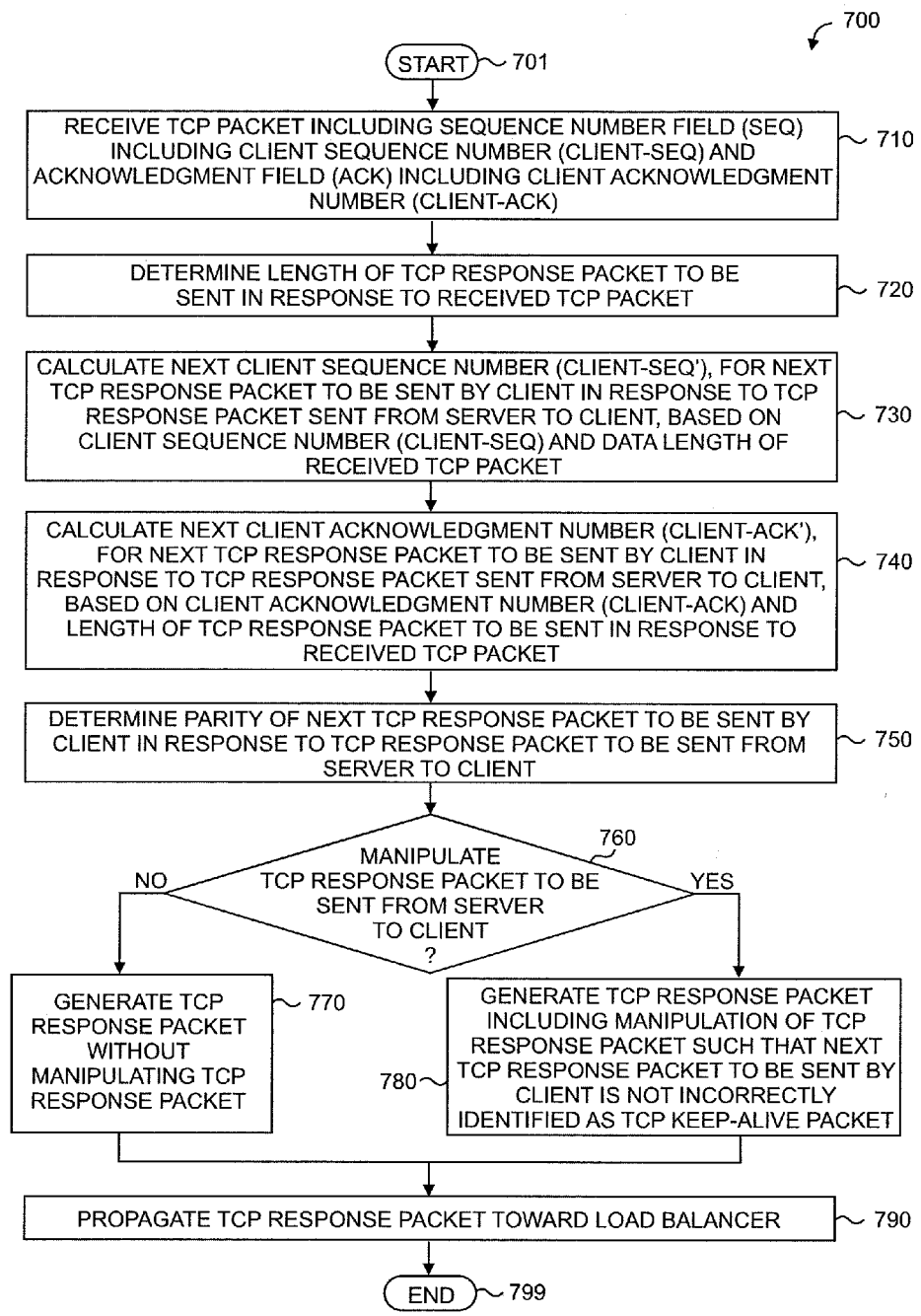
FIG. 7 depicts one embodiment of a method for processing a TCP packet of a TCP connection at a server in a manner for enabling a load balancer to recognize TCP keep-alive packets on the TCP connection.

FIG. 7 depicts one embodiment of a method for processing a TCP packet of a TCP connection at a server in a manner for enabling a load balancer to recognize TCP keep-alive packets on the TCP connection. It will be appreciated that the steps of method 700 may be performed by a server (e.g., a server 120 depicted and described with respect to FIG. 1). It will be appreciated that, although primarily depicted and described as being performed serially, at least a portion of the steps of method 700 may be performed contemporaneously or in a different order than presented in FIG. 7.

At step 701, method 700 begins.

At step 710, the server receives a TCP packet of a TCP connection. The TCP packet includes a sequence number field (SEQ) including a client sequence number (client-seq) and an acknowledgment field (ACK) including a client acknowledgement number (client-ack). The TCP packet has an associated data length.

At step 720, the server determines the length of the TCP response packet to be sent from the server to the client in response to the received TCP packet.

At step 730, the server calculates the next client sequence number (client-seq') for the next TCP response to be sent by the client in response to the TCP response packet to be sent from the server to the client. The server calculates the next client sequence number client-seq' as a sum of the client sequence number of the received TCP packet (client-seq) and a data length of the received TCP packet.

At step 740, the server calculates the next client acknowledgment number (client-ack') for the next TCP response to be sent by the client in response to the TCP response packet to be sent from the server to the client. The server calculates the next client acknowledgment number client-ack' as a sum of the client acknowledgement number of the received TCP packet (client-ack) and the length of the TCP response packet to be sent by the server (before any associated manipulation which may be performed by the server).

At step 750, the server determines the parity of the next TCP response packet to be sent by the client in response to the TCP response packet to be sent from the server to the client. The server determines the parity of the next TCP response packet to be sent by the client based on the next client sequence number (client-seq') for the next TCP response packet to be sent by the client and the next client acknowledgment number (client-ack') for the next TCP response packet to be sent by the client. In at least some embodiments, the server determines the parity of the next TCP response packet to be sent by the client using the test ((LSB of client-seq'+LSB of client-ack') & 1).

At step 760, the server determines whether to manipulate the TCP response packet to be sent from the server to the client. The server determines whether to manipulate the TCP response packet to be sent from the server to the client based on a determination as to whether the next TCP response packet to be sent by the client in response to the TCP response packet to be sent from the server to the client (again, before any associated manipulation which may be performed by the server) will be improperly recognized by the load balancer as a TCP keep-alive packet. The server determines whether the next TCP response packet to be sent by the client in response to the TCP response packet to be sent from the server to the client will be improperly recognized by the load balancer as a TCP keep-alive packet based on the parity of the next TCP response packet to be sent by the client and a parity rule used by the server and the load balancer. The parity rule indicates an expected parity of a TCP keep-alive packet (e.g., an indication as to whether even or odd parity indicates a TCP keep-alive packet). The server determines whether the next TCP response packet to be sent by the client in response to the TCP response packet to be sent from the server to the client will be improperly recognized by the load balancer as a TCP keep-alive packet by determining whether the parity of the next TCP response packet to be sent by the client matches the expected parity of the TCP keep-alive packet. The server, based on a determination that the parity of the next TCP response packet to be sent by the client does not match the expected parity of the TCP keep-alive packet, generates the TCP response without manipulation of the TCP response (illustratively, method 700 proceeds to step 770). The server, based on a determination that the parity of the next TCP response packet to be sent by the client matches the expected parity of the TCP keep-alive packet, generates the TCP response including manipulating the TCP response (illustratively, method 700 proceeds to step 780). For example, assume that the parity rule supported by the server and the load balancer indicates that the parity for TCP keep-alive packets is to be odd (1). If the parity of the next TCP response packet to be sent by the client in response to the TCP response packet to be sent from the server to the client is even, the load balancer will not improperly recognize the next TCP response packet to be sent by the client as a TCP keep-alive packet and, thus, method 700 proceeds to step 770 since no manipulation of the TCP response packet of the server is needed. If the parity of the next TCP response packet to be sent by the client in response to the TCP response packet to be sent from the server to the client is odd, the load balancer would improperly recognize the next TCP response packet to be sent by the client as a TCP keep-alive packet without manipulation of the TCP response of the server and, thus, method 700 proceeds to step 780 such that manipulation of the TCP response packet of the server may be performed.

For example, assume that the parity rule supported by the server and the load balancer indicates that the parity for TCP keep-alive packets is to be even (0). If the parity of the next TCP response packet to be sent by the client in response to the TCP response packet to be sent from the server to the client is odd, the load balancer will not improperly recognize the next TCP response packet to be sent by the client as a TCP keep-alive packet and, thus, method 700 proceeds to step 770 since no manipulation of the TCP response packet of the server is needed. If the parity of the next TCP response packet to be sent by the client in response to the TCP response packet to be sent from the server to the client is even, the load balancer will improperly recognize the next TCP response packet to be sent by the client as a TCP keep-alive packet without manipulation of the TCP response of the server and, thus, method 700 proceeds to step 780 such that manipulation of the TCP response packet of the server may be performed.

At step 770, the server generates the TCP response packet without manipulating the TCP response packet. The typical manner in which such a TCP response packet may be generated will be understood by one skilled in the art. From step 770, method 700 proceeds to step 790.

At step 780, the server generates the TCP response including a manipulation of the TCP response of the server such that the next TCP response packet to be sent by the client in response to the TCP response of the server is not incorrectly identified as a TCP keep-alive packet. The server may manipulate the TCP response by padding the TCP response with one or more bytes. The server may pad the TCP packet with one or more bytes in any suitable manner, which may depend on the application being supported by the TCP connection. The server may choose the location and contents of the padding byte(s) such that the application layer protocol is not impacted. For example, if the application protocol is HTTP or SIP, a custom header could be inserted having a length of an odd number of bytes (like "X:p\r\n", which is 5 bytes). For example, a whitespace character (e.g., space—ASCII 0x20—or newline—ASCII 0x0a) may be appended to an XML message (e.g., as used by XMPP or HTML response bodies) without changing the semantics of the XML message. Various other protocols may have various other options for padding of one or more bytes (although at least some such protocols may require other modifications in order to support addition of one or more padding bytes). The padding of the TCP packet by the server 120 may be performed in any suitable manner. In at least some embodiments, in which the application layer protocol is known by the TCP stack of the server, the TCP stack of the server may perform the padding of the TCP packet in a manner that is transparent to the application layer protocol. In at least some embodiments, in which the application layer protocol is not known by the TCP stack of the server or it is required or desired that the padding not be performed by the TCP stack of the server, the TCP stack of the server may provide TCP packet padding information to the application for use by the application to perform the padding of the TCP packet (e.g., a hint as to whether the application needs to send an odd or even number of bytes as response). In at least some embodiments, padding of the TCP packet may be performed at the application layer without the application layer requiring TCP packet padding information from the TCP stack of the server. From step 770, method 700 proceeds to step 790.

At step 790, the server propagates the TCP response packet toward the load balancer. It will be appreciated that the TCP response packet also is ultimately propagated from the load balancer to the client.

At step 799, method 700 ends.

Referring back to FIG. 1, the LB 130 is configured to receive a TCP packet and determine whether or not the TCP packet is a TCP keep-alive packet (as opposed to some other type of TCP packet). An exemplary embodiment is depicted and described with respect to FIG. 8.

Figure 8:
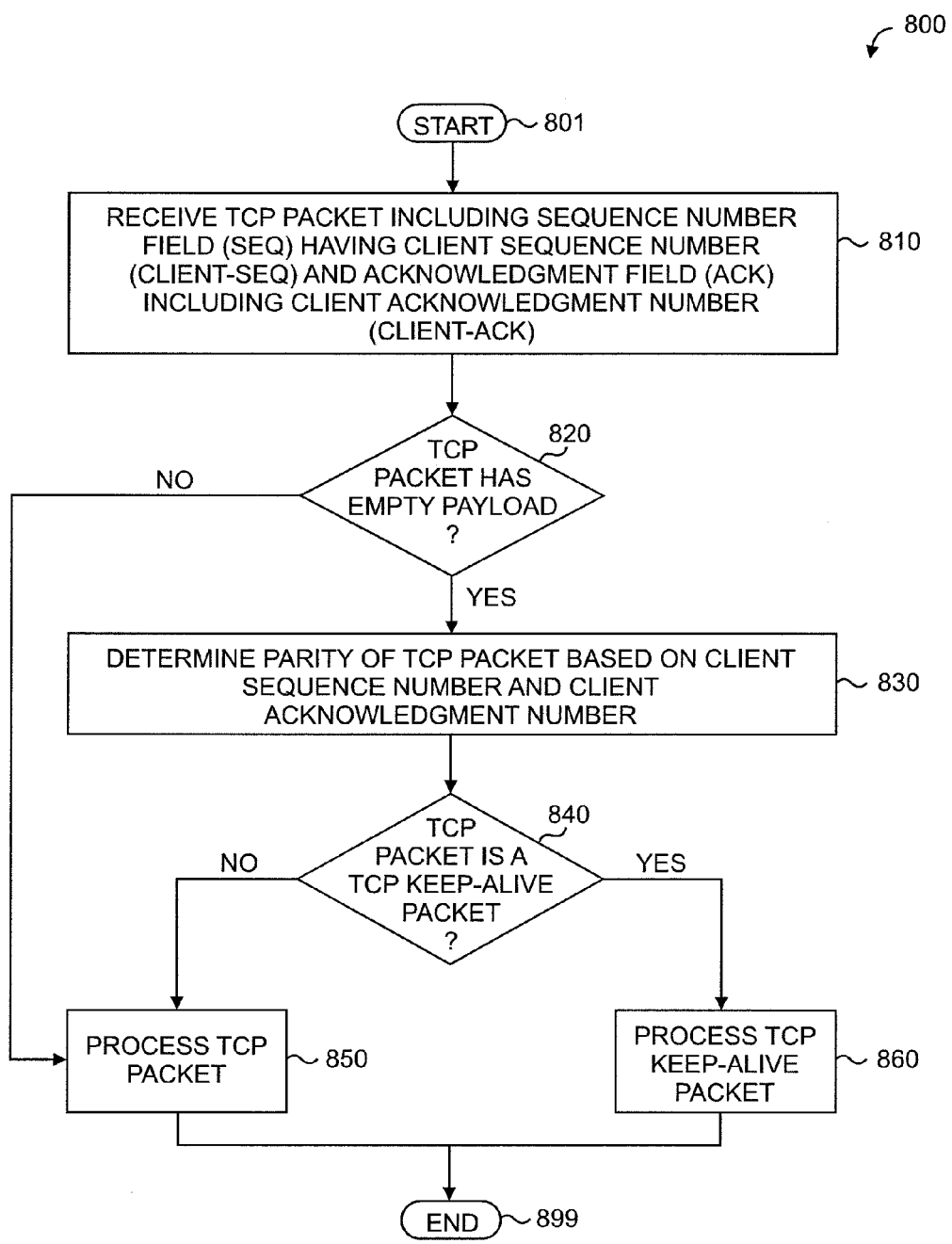
FIG. 8 depicts one embodiment of a method for processing a TCP packet of a TCP connection at a load balancer for determining whether the TCP packet is a TCP keep-alive packet.

FIG. 8 depicts one embodiment of a method for processing a TCP packet of a TCP connection at a load balancer for determining whether the TCP packet is a TCP keep-alive packet. It will be appreciated that the steps of method 800 may be performed by a load balancer (e.g., LB 130 depicted and described with respect to FIG. 1). It will be appreciated that, although primarily depicted and described as being performed serially, at least a portion of the steps of method 800 may be performed contemporaneously or in a different order than presented in FIG. 8.

At step 801, method 800 begins.

At step 810, a TCP packet is received. The TCP packet includes a sequence number field (SEQ) including a client sequence number (client-seq) and an acknowledgment field (ACK) including a client acknowledgment number (client-ack).

At step 820, a determination is made as to whether the TCP packet has an empty payload (i.e., the length of the payload of the TCP packet is zero), which indicates that the received TCP packet may be a TCP ACK packet, a TCP data packet with an empty payload, or a TCP keep-alive packet. If a determination is made that the TCP packet does not have an empty payload, method 800 proceeds to step 850, at which point the TCP packet is processed in a manner for handling TCP packets other than TCP keep-alive packets. If a determination is made that the TCP packet does have an empty payload, method 800 proceeds to step 830 such that additional processing may be performed for determining whether the TCP packet is a TCP keep-alive packet.

At step 830, the parity of the TCP packet is determined. The parity of the TCP packet may be determined based on the client sequence number (client-seq) and the client acknowledgment number (client-ack). The parity of the TCP packet may be determined based on ((LSB of client-seq+ LSB of client-ack) & 1).

At step 840, a determination is made as to whether the TCP packet is a TCP keep-alive packet based on the parity of the TCP packet and a parity rule supported by the load balancer and the server. The parity rule is indicative as to whether the parity of TCP keep-alive packets is to be odd (0) or even (1). For example, if the parity rule supported by the server and the load balancer indicates that the parity for TCP keep-alive packets is to be odd, then the packet is identified as being a TCP keep-alive packet if the parity of the TCP packet is odd and is not identified as being a TCP keep-alive packet if the parity of the TCP packet is even. Similarly, for example, if the parity rule supported by the server and the load balancer indicates that the parity for TCP keep-alive packets is to be even, then the packet is identified as being a TCP keep-alive packet if the parity of the TCP packet is even and is not identified as being a TCP keep-alive packet if the parity of the TCP packet is odd. It will be appreciated that the server may be configured to use a similar parity test for determining whether the load balancer will improperly recognize a next TCP response to be sent by the client as a TCP keep-alive packet and, thus, to determine whether or not the next TCP response packet sent by the server is to be manipulated (e.g., as depicted and described with respect to method 700 of FIG. 7). If the TCP packet is not a TCP keep-alive packet, method 800 proceeds to step 850. If the TCP packet is a TCP keep-alive packet, method 800 proceeds to step 860.

At step 850, the TCP packet is processed in a manner for handling TCP packets other than TCP keep-alive packets. For example, the TCP packet may be forwarded toward an appropriate server. For example, the TCP packet may be processed as depicted and described with respect to method 400 of FIG. 4. The TCP packet may be handled in any other suitable manner. From step 850, method 800 proceeds to step 899.

At step 860, the TCP keep-alive packet is processed in a manner for handling TCP keep-alive packets. For example, a corresponding TCP keep-alive response may be sent to the client without the TCP keep-alive packet being forwarded to the server. The TCP keep-alive packet may be handled in any other suitable manner. From step 860, method 800 proceeds to step 899.

At step 899, method 800 ends.

The operation of a server 120 and LB 130 in enabling LB 130 to recognize TCP keep-alive packets of a TCP connection between a client 110 and the server 120 may be better understood by considering a typical TCP packet exchange between the client 110 and the server 120 that traverses the LB 130. In this example, it is assumed that the parity rule maintained by the server 120 and the LB 130 indicates that odd parity is indicative of a TCP keep-alive packet (although it will be appreciated that the example could be modified for the case in which even parity is indicative of a TCP keep-alive packet).

The TCP connection starts with an initial three-way handshake as follows. The client 110 sends a TCP SYN packet including an initial client sequence number (denoted as client-seq) and an ACK value of "0". The server 120 responds to the TCP SYN packet by sending a TCP SYN+ACK packet including an initial server sequence number (denoted as server-seq) and an ACK value equal to the initial client sequence number incremented by one (ACK=client-seq+1). The client 110 responds to the TCP SYN+ACK packet by sending a TCP ACK packet including a client sequence number that has been incremented by one (client-seq+1) and an ACK value equal to the initial server sequence number incremented by one (ACK=server-seq+1). The TCP ACK packet sent from the client 110 to the server 120 typically does not include any data (i.e., the payload is empty). The manner in which the LB 130 may operate on the three TCP packets of this initial three-way handshake is ignored for the moment.

As an example, assume that client 110 starts with an initial client sequence number of zero and that server 120 uses zeros for all bits except the parity bit. In this example, the initial three-way handshake for the TCP connection may be expressed as (shown here as 31:1 bits):
1. client 110 sends TCP SYN with <client-seq=0, ack=0>
2. server 120 sends TCP SYN+ACK with <server-seq=0: 0, ack=1>
3. client 110 sends TCP ACK with <client-seq=1, ack=0: 1>.

The LB 130 receives the TCP ACK packet from client 110. The LB 130 is not immediately aware of the type of TCP packet which has been received. Namely, LB 130 is not immediately aware that a TCP ACK packet has been received (as opposed to a TCP keep-alive packet or some other type of TCP packet). The LB 130 determines that the received TCP packet is empty (i.e., the length of the payload of the received TCP packet is zero), which indicates that the received TCP packet may be a TCP ACK packet (as is the case), a TCP keep-alive packet, or a TCP data packet with an empty payload. The LB 130 calculates the parity of the received TCP packet (e.g., using (LSB of client-seq+LSB of client-ack) & 1)) and uses the parity of the received TCP packet to determine whether or not the received TCP packet is a TCP keep-alive packet. In this case, the result of the calculation is zero such that LB 130 determines that the received TCP packet is not a TCP keep-alive packet and initiates appropriate handling of the TCP packet (e.g., forwarding the TCP packet, in this case a TCP ACK packet, toward the server 120).

In continuation of the above example, further assume that the client 110 then sends a 10-byte request packet and the server 120 responds with a 10-byte response packet. This TCP packet exchange may be expressed as (shown here as 31:1 bits):
1. client 110 sends TCP PSH,ACK with <client-seq=1, ack=0:1> and 10 bytes of payload;
2. server 120 sends PSH,ACK with <server-seq=0:1, ack=11> and 10 bytes of payload; and
3. client 110 sends ACK with <client-seq=11, ack=11 (5:1)> and 0 bytes of payload.

The LB 130 receives the TCP ACK packet from client 110. The LB 130, again, is not immediately aware of the type of TCP packet which has been received. Namely, LB 130 is not immediately aware that a TCP ACK packet has been received (as opposed to a TCP keep-alive packet or some other type of TCP packet). The LB 130 determines that the received TCP packet is empty (i.e., the length of the payload of the received TCP packet is zero), which indicates that the received TCP packet may be a TCP ACK packet (as is the case), a TCP keep-alive packet, or a TCP data packet with an empty payload. The LB 130 calculates the parity of the received TCP packet (e.g., using (LSB of client-seq+LSB of client-ack) & 1)) and uses the parity of the received TCP packet to determine whether or not the received TCP packet is a TCP keep-alive packet. In this case, the result of the calculation is zero such that LB 130 determines that the received TCP packet is not a TCP keep-alive packet and initiates appropriate handling of the received TCP packet (e.g., forwarding the TCP packet, in this case a TCP ACK packet, toward the server 120). Here, it is noted that, had the client 110 chosen to send an 11-byte payload (or any other odd amount of payload bytes), the server 120 would have had to manipulate its TCP response packet in a manner for preventing LB 130 from falsely identify the subsequent ACK packet from the client as a TCP keep-alive packet (e.g., manipulating itsTCP response such that it also includes an odd number of bytes).

In continuation of the above example, further assume that the client 110 then sends a TCP keep-alive packet. In general, if the TCP keep-alive feature is enabled for the TCP connection and the TCP connection remains idle for a (configurable) period of time, the TCP stack 113 of the client 110 will send the TCP keep-alive packet in order to verify that the TCP connection is still working. This TCP keep-alive packet may be expressed as:
1. client 110 sends TCP keep-alive with <client-seq=11−1=10, ack=11> and 0 bytes of payload.

The LB 130 receives the TCP keep-alive packet from client 110. The LB 130, again, is not immediately aware of the type of TCP packet which has been received. Namely, LB 130 is not immediately aware that a TCP keep-alive packet has been received (as opposed to a TCP ACK packet or some other type of TCP packet). The LB 130 determines that the received TCP packet is empty (i.e., the length of the payload of the received TCP packet is zero), which indicates that the received TCP packet may be a TCP ACK packet, a TCP keep-alive packet (as is the case), or a TCP data packet with an empty payload. The LB 130 calculates the parity of the received TCP packet (e.g., using (LSB of client-seq+ LSB of client-ack) & 1)) and uses the parity of the received TCP packet to determine whether or not the received TCP packet is a TCP keep-alive packet. In this case, the result of the calculation is one, such that LB 130 determines that the received TCP packet is a TCP keep-alive packet and initiates appropriate handling of the TCP packet (e.g., sending a TCP keep-alive response packet to the client 110 while also filtering the TCP keep-alive packet to prevent forwarding of the TCP keep-alive packet to the server 120).

It will be appreciated that the LB 130 may only need to be configured to identify TCP keep-alive packets for a specific type of TCP implementation. For example, where LB 130 performs stateless TCP load balancing for TCP connections of an application which may only may be used by LINUX-based clients (or other similar types of TCP implementations), LB 130 does not necessarily need to include logic for detecting TCP keep-alive packets for other types of TCP implementations (e.g., LB 130 may not perform any additional processing to check TCP packets having one-byte payloads). Similarly, for example, where LB 130 performs stateless TCP load balancing for TCP connections of an application which may only be used by WINDOWS-based clients (or other similar types of TCP implementations), LB 130 does not necessarily need to include logic for detecting TCP keep-alive packets for other types of TCP implementations (e.g., LB 130 may not perform any additional processing to check TCP packets having zero-byte payloads).

It will be appreciated that LB 130 may be configured to identify TCP keep-alive packets for other types of TCP implementations in which the TCP keep-alive packets may have other sets of characteristics associated therewith (e.g., other payload lengths, different types of payload values, other flag combinations, or the like, as well as various combinations thereof).

It will be appreciated that, although primarily depicted and described with respect to embodiments in which the server is configured to perform processing in order to ensure that a TCP packet that is sent by the server 120 and which might trigger an associated TCP response packet from the client will not cause the TCP response packet that is sent by the client 110 to be wrongly identified by LB 130 as being a TCP keep-alive packet when it is in fact not a TCP keep-alive packet, in at least some embodiments the processing that is performed in order to ensure that a TCP packet that is sent by the server 120 and which might trigger an associated TCP response packet from the client 110 will not cause the TCP response packet that is sent by the client 110 to be wrongly identified by LB 130 as being a TCP keep-alive packet when it is in fact not a TCP keep-alive packet may be performed by any other suitable element. For example, a stateful NAT gateway located between the server 120 and the client 110 might perform the required modification to the TCP response packet sent from the server 120 to the client 110.

It will be appreciated that, although primarily depicted and described with respect to embodiments in which the server of a TCP connection is configured to perform manipulation of TCP response packets of the server such that the next TCP response to be sent by the client in response to the TCP response of the server is not incorrectly identified as a TCP keep-alive packet, in at least some embodiments such manipulation by the server may not be needed if the client supports TCP timestamps (e.g., determined by the presence of a TCP timestamp option header in the SYN packet sent by client, as specified in RFC 1323). The server may be configured to identify that the client supports TCP timestamps and to add a timestamp option header to the TCP response packets that the server sends to the client, where one bit of the value inserted by the server (e.g., the LSB) is designated as a parity bit and set to an appropriate parity value based on the test ((LSB of client-seq'+LSB of client-ack') & 1) as previously discussed. The load balancer may be configured to first check for the presence of a timestamp option header in a received TCP packet and to then perform a test (((LSB of client-seq'+LSB of client-ack'+timestamp.ecr) & 1), where "timestamp.ecr" is the value of the 'ecr' field in the timestamp option header (which is set by the client 110 to be equal to the value of the timestamp last sent by server 120)). The load balancer 130 may then determine whether or not a received TCP packet is a TCP keep-alive packet based on the result of the test ((LSB of client-seq'+ LSB of client-ack'+timestamp.ecr) & 1) and the parity rule supported by the load balancer 130 and the server 120.

It will be appreciated that at least some situations may arise in which one or more embodiments of the TCP keep-alive packet detection as depicted and described herein may result in false positives (i.e., false identification of a TCP packet as a TCP keep-alive packet when in fact it is not a TCP keep-alive packet). An example is when the server 120 sends a multi-segmented TCP response, because the associated client 110 may acknowledge every second TCP segment of the TCP response with a TCP packet having a 0-byte payload that might be wrongly identified by the load balancer 130 as being a TCP keep-alive packet, in which case the server 120 would not receive TCP window updates and, thus, may stop sending on the TCP connection.

In at least some embodiments, the potential false positive problem for multi-segmented TCP responses of a TCP connection may be avoided by configuring the server 120 to correct the parity of the TCP connection when the first server data segment of the TCP connection is sent by the server 120. In the case of a LINUX-based OS, for example, the LINUX-based OS typically sends a TCP response as (N*max-segment-size (MSS)) packets plus a final packet for the remainder of the TCP response, where MSS is typically even (e.g., 1460 or any other suitable value). In at least some embodiments, if the client 110 sends a TCP packet (e.g., a request) having an odd number of bytes, the first segment sent by the server 120 may be configured to include MSS-1 bytes in order to maintain even parity for the TCP connection, and then the rest of the data of the TCP response may be sent in the usual manner. In at least some embodiments, if the client 110 sends a TCP packet (e.g., a request) indicating an MSS that is even (e.g., 1460), the server 120 may be configured to instead use an odd value for the MSS (e.g., when the client 110 indicates that MSS=1460, the server uses MSS=1459); however, at least some such embodiments may depend on the client 110 not sending acknowledgments for every other data segment of the TCP response. It will be appreciated that the Network Interface Card (NIC) of the client 110 that is supporting the TCP connection may include a feature known as TCP Segmentation Offload (TSO), which may need to be disabled in order for the server 120 to be able to correct the size of the first server data segment of the TCP connection that is sent by the server 120.

In at least some embodiments, the potential false positive problem for multi-segmented TCP responses of a TCP connection may be avoided based on the advertised window size of the TCP connection. For example, the load balancer 130 may be configured to evaluate the advertised window size based on an assumption that a smaller advertised window size indicates that the TCP packet is less likely to be a TCP keep-alive packet. However, due to window scaling (which is typically only announced in the initial SYN/ACK exchange between the client 110 and the server 120) the absolute value of the advertized window size in individual packets of the TCP connection can be hard to interpret. In at least some embodiments, window scaling may be disabled on the client 110 in order to make the evaluation of the advertised window size of TCP packets more accurate, however, certain types of clients (e.g., WINDOWS-based clients) may still send 0-byte TCP ACK packets with a large window size (which might wrongly be identified as TCP keep-alive packets).

It will be appreciated that, although solutions to the potential false positive problem for multi-segmented TCP responses of a TCP connection are provided above, in at least some situations identification of false positives (e.g., filtering of 0-byte ACK packets) may be acceptable (e.g., for applications that use TCP responses that are smaller than the advertised window size of the client 110, since in many cases problems may not arise from identification of false positives as long as the TCP responses remain smaller than the advertised window size of the client 110).

It will be appreciated that use of TCP keep-alive packet detection and filtering may be advantageous for various types of applications and TCP implementations. It will be further appreciated that use of TCP keep-alive packet detection and filtering may be particularly advantageous for use by applications that send TCP keep-alive packets with a relatively high frequency (e.g., relative to transmission of TCP requests and responses via the TCP connections, relative to other applications, or the like). An example of one such application is an application that uses the WebSocket protocol, which is implemented in various browser versions, in which TCP keep-alive messages are sent every 45 seconds. This means that, every 45 seconds, an otherwise idle TCP connection sends a packet of at least 54 bytes (e.g., may be 55 bytes for a WINDOWS-based client, and may be more if timestamps are used). These relatively small packets can, in many cases, represent a significant percentage of the traffic on the TCP connection. For example, for a connection with a 2 BHCA (busy hour call attempts) traffic profile: (1) the connection would send 2*(REGISTER+INVITE+ACK+BYE), which is approximately 4000 bytes and (2) the keep-alive traffic is 3600/45−8 (periods in which the connection is not idle due to requests being sent)=72 packets of 54 bytes, for a total of 3888 bytes. Thus, in this example, the TCP keep-alive packets represent approximately 50% of the traffic exchanged on the TCP connection. Accordingly, use of embodiments of TCP keep-alive packet detection and filtering to handle such TCP keep-alive packets at the load balancer, rather than at the server, would reduce the bandwidth between the load balancer and the server by approximately 50%.

It will be appreciated that, although primarily depicted and described with respect to use of a single load balancer to statelessly balance TCP connections of clients across a set of servers, in at least some embodiments multiple load balancers may be used to statelessly balance TCP connections of clients across a set of servers (e.g., for improved performance, improved reliability, or the like). In at least some embodiments, a load balancer protection scheme may be used in order to protect against load balancer failures (e.g., a 1:1 protection scheme, a 1:N protection scheme, or the like). In at least some embodiments, in which a first load balancer fails and a second load balancer takes over load balancing responsibility for the first load balancer, the second load balancer may not have any historical information indicative of how TCP connections have been distributed across the set of servers used by the first load balancer to perform load balancing and, thus, may determine a new distribution based on the set of servers to be used by the second load balancer to perform load balancing (even though existing TCP connections were arranged according to the distribution of the first load balancer). In at least some embodiments, the second load balancer may, for a configurable period after startup or after beginning load balancing, enter a learning mode. The configurable period may be measured based on one or more of a number of packets processed before leaving the learning mode, a percentage of mapping entries to have been learned during the learning mode, a fixed time interval, or the like). In the learning mode, the second load balancer, rather than responding negatively to an incoming TCP keep-alive packet based on a determination that there is a mismatch between the server index of the TCP keep-alive packet (e.g., upper n bits of the sequence number or any other suitable encoding of server index within the TCP keep-alive packet) and the server index calculated by the second load balancer based on receipt of the TCP keep-alive packet, updates its mapping information with the mapping information from the TCP keep-alive packet (i.e., use of the existing server index from the TCP keep-alive packet) and forwards the TCP keep-alive packet to the server indicated by the server index included within the TCP keep-alive packet (rather than the computed server index). In this manner, using the learning mode, the second load balancer is able to reconstruct at least a portion of the load balancing configuration that the first load balancer was using from the TCP keep-alive packets that the second load balancer receives from the associated clients. In the learning mode, the second load balancer also may collect other types of information which also may have been collected by the first load balancer when the first load balancer was active (e.g., server response times, server load information, or the like, as well as various combinations thereof). In at least some embodiments, the second load balancer may transition from the learning mode to an operating mode in which the second load balancer will interpret a mismatch between the server index of the TCP keep-alive packet and the server index calculated by the second load balancer based on receipt of the TCP keep-alive packet as an indication that the server of the TCP connection has changed, as previously described. It will be appreciated that use of one or more such transition modes (e.g., the learning mode discussed above) may enable a more smooth transition between load balancers in various failover scenarios.

It will be appreciated that, although primarily depicted and described herein with respect to embodiments in which a load balancer is configured to provide various functions depicted and described herein, in at least some embodiments one or more of the functions presented herein may be provided by any suitable type of device(s) or element(s) configured to provide a load balancing function (e.g., a network device of a communication server provider, a device or element of a data center hosting one or more servers, or the like). It will be appreciated that, although primarily depicted and described herein with respect to embodiments in which a load balancer is configured to provide various functions depicted and described herein, in at least some embodiments one or more of the functions presented herein as being performed by a load balancer may be performed by one or more other types of devices or elements.

It will be appreciated that, although primarily depicted and described with respect to embodiments in which stateless handling of connections is performed for a specific type of connection (namely, for TCP connections), in at least some embodiments stateless handling of other types of connections may be supported. Various embodiments may be provided for supporting stateless management of connections of one or more other types of protocols (e.g., one or more other protocols at the transport layer of the OSI model, one or more other protocols at the transport layer of the IP Suite, one or more protocols at one or more other layers of the OSI model, one or more protocols at one or more other layers of the IP Suite, one or more other protocols which may have one or more characteristics derived from or similar to TCP, one or more other connection-oriented protocols which may be managed in a stateless manner using various embodiments presented herein, or the like, as well as various combinations thereof). Thus, various TCP-specific terms used herein may be read more generally. For example, references herein to TCP SYN packets may be read more generally as synchronization packets or synchronization messages, references herein to TCP SYN+ACK packets may be read more generally as synchronization+acknowledgment packets (or synchronization and acknowledgment) packets or synchronization+acknowledgment packets (or synchronization and acknowledgment) messages, references herein to TCP keep-alive packets may be read more generally as keep-alive packets or messages, and so forth.

Various other protocol-specific terms used herein also may be read more generally in a similar manner. Thus, it will be appreciated that various embodiments depicted and described herein within the context of TCP may be provided within the context of various other types of protocols and environments.

Figure 9:
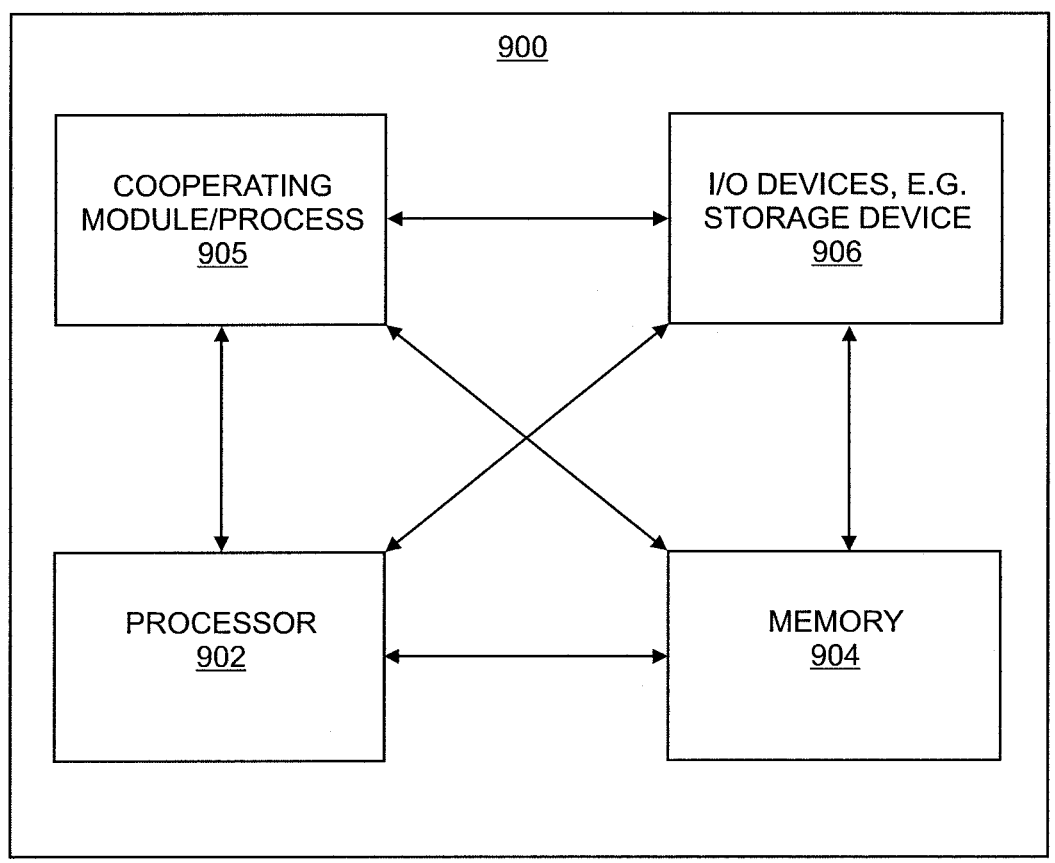
FIG. 9 depicts a high-level block diagram of a computer suitable for use in performing functions described herein.

FIG. 9 depicts a high-level block diagram of a computer suitable for use in performing functions described herein.

The computer 900 includes a processor 902 (e.g., a central processing unit (CPU) or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein or portions of functional elements described herein. For example, the computer 900 provides a general architecture and functionality suitable for implementing one or more of a client 110, a portion of a client 110, a server 120, a portion of a server 120, load balancer 130, a portion of load balancer 130, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents or suitable types of hardware, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in a tangible and non-transitory computer-readable storage medium, such as in fixed or removable media, within a memory within a computing device operating according to the instructions, or the like.

It will be appreciated that the term "or" as used herein refers to a non-exclusive "or" unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
   a processor and a memory communicatively connected to the processor, the processor configured to:
   receive a Transmission Control Protocol (TCP) SYN packet comprising a source address field including an address of a client from which the TCP SYN packet is received and a destination address field including an address of a load balancer;
   select a server to support a TCP connection for the client;
   form, based on the TCP SYN packet, a modified TCP SYN packet comprising a source address field including the address of the load balancer, a destination address field including an address of the server, the address of the client, a server index of the server, and a value indicative of a size of the server index of the server; and
   propagate the modified TCP SYN packet toward the selected server.

2. The apparatus of claim 1, wherein the processor is configured to select the server based on at least one of:
   a hash value computed based on one or more fields of the TCP SYN packet; or
   server performance information associated with one or more servers of a set of servers available for selection as the selected server.

3. The apparatus of claim 1, wherein the processor is configured to insert the address of the client into an ACK field of the modified TCP SYN packet, a TCP option header of the modified TCP SYN packet, or a trailer field of the modified TCP SYN packet.

4. The apparatus of claim 1, wherein, to form the modified TCP SYN packet, the processor is configured to:
   insert at least one timestamp into the modified TCP SYN packet.

5. The apparatus of claim 1, wherein the processor is configured to insert the server index of the server into an upper n bits of a sequence number of the modified TCP SYN packet or n bits of a timestamp value of a TCP options header of the modified TCP SYN packet.

6. The apparatus of claim 1, wherein the processor is configured to:
   compute a hash value based on one or more fields of the TCP SYN packet; and
   identify the server index of the server from a mapping of the hash value to the server index of the server.

7. An apparatus, comprising:
   a processor and a memory communicatively connected to the processor, the processor configured to:
   receive a synchronization message comprising a source address field including an address of a client from which the synchronization message is received and a destination address field including an address of a load balancer;
   select a server to support a connection for the client;
   form, based on the synchronization message, a modified synchronization message comprising a source address field including the address of the load balancer, a destination address field including an address of the server, the address of the client, a server index of the server, and a value indicative of a size of the server index of the server; and
   propagate the modified synchronization message toward the selected server.

8. The apparatus of claim 7, wherein the processor is configured to select the server based on at least one of:
   a hash value computed based on one or more fields of the synchronization message; or
   server performance information associated with one or more servers of a set of servers available for selection as the selected server.

9. The apparatus of claim 7, wherein the processor is configured to insert the address of the client into an acknowledgment field of the modified synchronization message, an option header of the modified synchronization message, or a trailer field of the modified synchronization message.

10. The apparatus of claim 7, wherein, to form the modified synchronization message, the processor is configured to:
insert at least one timestamp into the modified synchronization message.

11. The apparatus of claim 7, wherein the processor is configured to insert the server index of the server into an upper n bits of a sequence number of the modified synchronization message or n bits of a timestamp value of an options header of the modified synchronization message.

12. The apparatus of claim 7, wherein the processor is configured to:
compute a hash value based on one or more fields of the synchronization message; and
identify the server index of the server from a mapping of the hash value to the server index of the server.

13. A method, comprising:
receiving, by a processor, a Transmission Control Protocol (TCP) SYN packet comprising a source address field including an address of a client from which the TCP SYN packet is received and a destination address field including an address of a load balancer;
selecting, by the processor, a server to support a TCP connection for the client;
forming, by the processor based on the TCP SYN packet, a modified TCP SYN packet comprising a source address field including the address of the load balancer, a destination address field including an address of the server, the address of the client, a server index of the server, and a value indicative of a size of the server index of the server; and
propagating, by the processor, the modified TCP SYN packet toward the selected server.

14. The method of claim 13, wherein the server is selected based on at least one of:
a hash value computed based on one or more fields of the TCP SYN packet; or
server performance information associated with one or more servers of a set of servers available for selection as the selected server.

15. The method of claim 13, wherein the address of the client is inserted into an ACK field of the modified TCP SYN packet, a TCP option header of the modified TCP SYN packet, or a trailer field of the modified TCP SYN packet.

16. The method of claim 13, wherein forming the modified TCP SYN packet comprises:
inserting at least one timestamp into the modified TCP SYN packet.

17. The method of claim 13, wherein forming the modified TCP SYN packet comprises inserting the server index of the server into an upper n bits of a sequence number of the modified TCP SYN packet or n bits of a timestamp value of a TCP options header of the modified TCP SYN packet.

18. The method of claim 13, further comprising:
computing a hash value based on one or more fields of the TCP SYN packet; and
identifying the server index of the server from a mapping of the hash value to the server index of the server.

19. A method, comprising:
receiving, by a processor, a synchronization message comprising a source address field including an address of a client from which the synchronization message is received and a destination address field including an address of a load balancer;
selecting, by the processor, a server to support a connection for the client;
forming, by the processor based on the synchronization message, a modified synchronization message comprising a source address field including the address of the load balancer, a destination address field including an address of the server, the address of the client, a server index of the server, and a value indicative of a size of the server index of the server; and
propagating, by the processor, the modified synchronization message toward the selected server.

20. The method of claim 19, wherein the server is selected based on at least one of:
a hash value computed based on one or more fields of the synchronization message; or
server performance information associated with one or more servers of a set of servers available for selection as the selected server.

21. The method of claim 19, wherein the address of the client is inserted into an acknowledgment field of the modified synchronization message, an option header of the modified synchronization message, or a trailer field of the modified synchronization message.

22. The method of claim 19, wherein forming the modified synchronization message comprises:
inserting at least one timestamp into the modified synchronization message.

23. The method of claim 19, wherein forming the modified synchronization message comprises inserting the server index of the server into an upper n bits of a sequence number of the modified synchronization message or n bits of a timestamp value of an options header of the modified synchronization message.

24. The method of claim 19, further comprising:
computing a hash value based on one or more fields of the synchronization message; and
identifying the server index of the server from a mapping of the hash value to the server index of the server.

* * * * *